(12) United States Patent
Yamaura et al.

(10) Patent No.: US 6,459,068 B1
(45) Date of Patent: Oct. 1, 2002

(54) LASER DEVICE, LASER MACHINING DEVICE AND OPTICAL AMPLIFIER

(75) Inventors: Hitoshi Yamaura; Hiroshi Sekiguchi, both of Akishima (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/717,225

(22) Filed: Nov. 22, 2000

(30) Foreign Application Priority Data

Nov. 25, 1999 (JP) .......................................... 11-334645

(51) Int. Cl.⁷ .............................. B23K 26/00; G02B 6/26
(52) U.S. Cl. ............................. 219/121.6; 372/6; 385/32
(58) Field of Search ....................... 219/121.62, 121.63, 219/121.64, 121.6; 372/6; 385/32

(56) References Cited

U.S. PATENT DOCUMENTS

| | | | | |
|---|---|---|---|---|
| 4,676,584 A | * | 6/1987 | Perlin | 385/32 |
| 5,923,694 A | * | 7/1999 | Culver | 372/6 |
| 5,937,134 A | * | 8/1999 | DiGiovanni | 372/6 |
| 6,052,392 A | * | 4/2000 | Ueda et al. | 372/6 |
| 6,229,939 B1 | * | 5/2001 | Komine | 372/6 |
| 6,317,537 B1 | * | 11/2001 | Ionov et al. | 385/32 |

FOREIGN PATENT DOCUMENTS

JP         11-284255         10/1999

* cited by examiner

Primary Examiner—Geoffrey S. Evans
(74) Attorney, Agent, or Firm—Sughrue Mion, PLLC

(57) ABSTRACT

A laser device that includes a laser beam guide portion (1) and an excitation beam guide portion (2) for confining an excitation beam and introducing the excitation beam into the laser beam guide portion (1) in a distribution state to perform laser oscillation or amplification. The excitation beam guide portion (2) is formed by winding or rounding a flexible beam guide member (21) having a ribbon-like or a sheet-like shape to form a thin integral body as a beam guide structure.

10 Claims, 14 Drawing Sheets

LASER DEVICE, LASER MACHINING DEVICE AND OPTICAL AMPLIFIER

BACKGROUND OF THE INVENTION

This Invention relates to a laser device, a laser machining device, and an optical amplifier each of which is for oscillating or amplifying a laser beam by supplying an excitation beam to a laser active material contained In a long-sized laser beam guide portion, such as an optical fiber, and, in particular, to a laser device, a laser machining device, and an optical amplifier of the type which are effectively applicable to the fields of optical communication, optical measurement, and laser machining.

In the fields of optical communication, optical measurement, and laser machining, it is desired to develop a laser device which is higher in output power or efficiency but is lower in cost. Presently, a fiber laser device is known as one of candidates which may possibly satisfy the above-mentioned demand.

The fiber laser device comprises an optical fiber as a laser beam guide portion (a so-called laser medium). The optical fiber comprises a core portion containing a laser active material and a cladding portion coaxially surrounding the core portion. By appropriately selecting the diameter of the core portion and the difference in optical refractive index between the core portion and the cladding portion, a single transverse mode of laser oscillation is relatively easily achieved.

In addition, by confining a light beam within the optical fiber at a high density, it is possible to enhance the interaction between the laser active material and the light beam. Since the length of interaction can be prolonged by increasing the length of the optical fiber, it is possible to generate a laser beam having a high quality in spatial characteristics at a high efficiency. Thus, the laser beam of an excellent quality can be obtained at a relatively low cost. In addition, optical amplification can be carried out at a high efficiency.

In order to achieve a higher output power and a higher efficiency of the laser beam, it is required to efficiently introduce an excitation beam to a laser active region (typically, the core portion) of the optical fiber so that the excitation beam is sufficiently absorbed in the laser active material, such as laser active ions, laser dyes, or any other emission center, added to the laser active region.

However, in order to satisfy a single-mode waveguide condition, the diameter of the core portion must be smaller than 20 $\mu$m. Generally, it is difficult to efficiently introduce the excitation beam to the core portion having such a small diameter.

In order to overcome the above-mentioned difficulty, proposal is made of a fiber laser device and a laser machining device in Japanese Unexamined Patent Publication (JP-A) No. H11-28425. The laser device comprises a laser fiber which has a core containing a laser active material and which is for producing a laser beam from its output end when the laser active material is excited. The laser fiber is, directly or indirectly through an optical medium, brought into contact with an beam guide structure adapted to confine an excitation beam for exciting the laser active material. The laser active material is excited by the excitation beam incident through a contact zone between the laser fiber and the beam guide structure.

Thus, the beam guide structure adapted to confine the excitation beam is used as an excitation beam guide portion. Through the excitation beam guide portion, the excitation beam is introduced from a side surface of the laser fiber as a laser beam guide portion. The excitation beam is introduced in a distributed state in which it is distributed along the length of the laser beam guide portion. By the excitation beam introduced into the laser beam guide portion in the distributed state, the laser active material contained in the laser beam guide portion is excited.

In this case, the introduction of the excitation beam into the excitation beam guide portion can be carried out through an incident prism portion formed at a desired position of the excitation beam guide portion. The excitation beam incident to the excitation beam guide portion is repeatedly reflected in the interior of the excitation beam guide portion to spread throughout the interior of the excitation beam guide portion. Then, the excitation beam is introduced into the laser beam guide portion through the contact portion where the excitation beam guide portion is directly or indirectly brought into contact with the side surface of the laser beam guide portion.

For example, the excitation beam guide portion comprises a hollow cylindrical structure or a flat disk-shaped structure. The excitation beam guide portion is supplied with the excitation beam from an excitation light source and transmits the excitation beam which is confined therein by internal reflection. The laser beam guide portion is brought into optical contact with the surface of the excitation beam guide portion over a predetermined length. For example, the laser beam guide portion in the form of a fiber is wound around the structure forming the excitation beam guide portion. Thus, the excitation beam confined within the excitation beam guide portion is incident into the laser beam guide portion through the contact zone.

With the laser device having the above-mentioned excitation structure, it is easy to introduce the excitation beam into the laser beam guide portion in the form of a fiber. In addition, the excitation beam can be introduced through a desired position on the structure forming the excitation beam guide portion. This facilitates the excitation by the use of a plurality of excitation light sources. In the past, the excitation beam could be introduced only through opposite end faces of the fiber.

In the above-mentioned conventional laser device, the excitation beam must be introduced at an efficiency as high as possible to the contact zone where the excitation beam guide portion is brought into contact with the laser beam guide portion in order to efficiently introduce the excitation beam from the excitation beam guide portion into the laser beam guide portion.

In order to efficiently excite the laser active material contained in the laser beam guide portion, it is required to extend the length of the contact zone where the excitation beam guide portion is brought into contact with the laser beam guide portion, i.e., to widen the area of distributed introduction of the excitation beam.

To this end, the excitation beam guide portion must have a surface area as large as possible. On the other hand, in order to increase the ratio of absorption of the excitation beam into the core portion, the excitation beam guide portion must have an internal volume as small as possible. If the internal volume of the excitation beam guide portion is large, an effective absorption coefficient becomes small so that an excitation efficiency is decreased due to an optical loss such as a scattering loss.

For example, the excitation beam guide portion is formed into a hollow cylindrical shape or a flat disk shape in order to have the large surface area. At any rate, the excitation beam guide portion must have a structure as thin as possible in order avoid the decrease in excitation efficiency. However, if such a thin structure is formed by molding or machining an optical material such as a glass, the production cost inevitably becomes high.

For example, in the above-referenced Japanese Unexamined Patent Publication (JP-A) No. H11-284255, a cylindrical glass tube is exemplified as the excitation beam guide portion. In order to avoid the decrease in excitation efficiency, the cylindrical glass tube must be reduced in thickness to about 0.5 mm or less. It is difficult to form such a thin structure by mechanical machining. This inevitably requires a high cost.

SUMMARY OF THE INVENTION

It is therefore an object of this invention to provide a laser device, a laser machining device, and an optical amplifier which are capable of increasing an efficiency of exciting a laser active material through an excitation beam guide portion to thereby achieve an increase in output power and output efficiency of a laser beam or an improvement in amplification efficiency at a low cost while keeping inherent merits of distributed introduction of an excitation beam into a longitudinal laser beam guide portion such as a laser fiber, for example, easy achievement of a single transverse mode of laser oscillation and production of a laser beam having a high quality in spatial characteristics at a high efficiency.

According to this invention, there is provided a laser device comprising an excitation beam guide portion for confining and propagating an excitation beam, and a longitudinal flexible laser beam guide portion containing a laser active material for producing a laser beam in response to the excitation beam introduced from the excitation beam guide portion into the laser beam guide portion in a distributed state, the excitation beam guide portion being formed by winding or rounding a ribbon-like or a sheet-like flexible beam guide member into a predetermined shape to form a thin integral body as a beam guide structure, at least one long-sized laser beam guide portion as a single-series wave guide structure being wound or rounded around the excitation beam guide-portion-to be brought into optical contact therewith over an optical contact zone having a predetermined length so that the excitation beam is introduced from the excitation beam guide portion into the laser beam guide portion in the distributed state in which the excitation beam is distributed over the optical contact zone.

Preferably, the excitation beam guide portion is supported by a supporting portion which serves as a radiator for promoting heat release.

Preferably, the excitation beam guide portion and the laser beam guide portion are surrounded by a light reflection surface at least in the optical contact zone.

Preferably, the excitation beam is introduced into the excitation beam guide portion through one end face of the beam guide member forming the excitation beam guide portion.

Preferably, the excitation beam is introduced into the excitation beam guide portion through one end face of the beam guide member forming the excitation beam guide portion and, if it reaches the other end face, is reintroduced into the one end face.

According to this invention, there is also provided a laser machining device comprising an excitation beam guide portion for confining and propagating an excitation beam, a longitudinal flexible laser beam guide portion containing a laser active material for producing a laser beam in response to the excitation beam introduced from the excitation beam guide portion into the laser beam guide portion in a distributed state, and irradiating means for irradiating the laser beam onto an object to be machined, the excitation beam guide portion being formed by winding or rounding a ribbon-like or a sheet-like flexible beam guide member into a predetermined shape to form a thin integral body as a beam guide structure, at least one long-sized laser beam guide portion as a single-series wave guide structure being wound or rounded around the excitation beam guide portion to be brought into optical contact therewith over an optical contact zone having a predetermined length so that the excitation beam is introduced from the excitation beam guide portion into the laser beam guide portion in the distributed state in which the excitation beam is distributed over the optical contact zone.

According to this invention, there is also provided an optical amplifier comprising an excitation beam guide portion for confining and propagating an excitation beam, and a longitudinal flexible laser beam guide portion containing a laser active material for producing a laser beam in response to the excitation beam introduced from the excitation beam guide portion into the laser beam guide portion in a distributed state, the excitation beam guide portion being formed by winding or rounding a ribbon-like or a sheet-like flexible beam guide member into a predetermined shape to form a thin integral body as a beam guide structure, at least one long-sized laser beam guide portion as a single-series wave guide structure being wound or rounded around the excitation beam guide portion to be brought into optical contact therewith over an optical contact zone having a predetermined length so that the excitation beam is introduced from the excitation beam guide portion into the laser beam guide portion in the distributed state in which the excitation beam is distributed over the optical contact zone.

According to this invention, there are also provided various modifications as follows.

A plurality of beam guide members arranged in parallel and adjacent to one another in a widthwise or transversal direction are wound or rounded to form a single excitation beam guide portion. The excitation beam is introduced into each of the beam guide members.

The excitation beam is introduced into the excitation beam guide portion through a lateral side of the beam guide member forming the excitation beam guide portion.

The excitation beam introduced into the excitation beam guide portion is advanced in a helical fashion along a winding or a rounding direction of the beam guide member forming the excitation beam guide portion to circulate throughout the excitation beam guide portion.

The excitation beam is introduced into the excitation beam guide portion through one end face of the beam guide member forming the excitation beam guide portion and, if it reaches the other end face, is returned by reflection.

The excitation beam introduced into the excitation beam guide portion is advanced in an advancing direction along a winding or a rounding direction of the beam guide member forming the excitation beam guide portion to circulate throughout the excitation beam guide portion with the advancing direction cyclically reflected and reversed.

With the above-mentioned structure, it is possible to easily and economically produce the excitation beam guide portion having a beam guide structure which is capable of efficiently confining the excitation beam with a reduced transmission loss and introducing the excitation beam into the laser beam guide portion in the distributed state.

Thus, the above-mentioned objects of this invention can be achieved.

DESCRIPTION OF THE PREFERRED EMBODIMENTS

Figure 1:
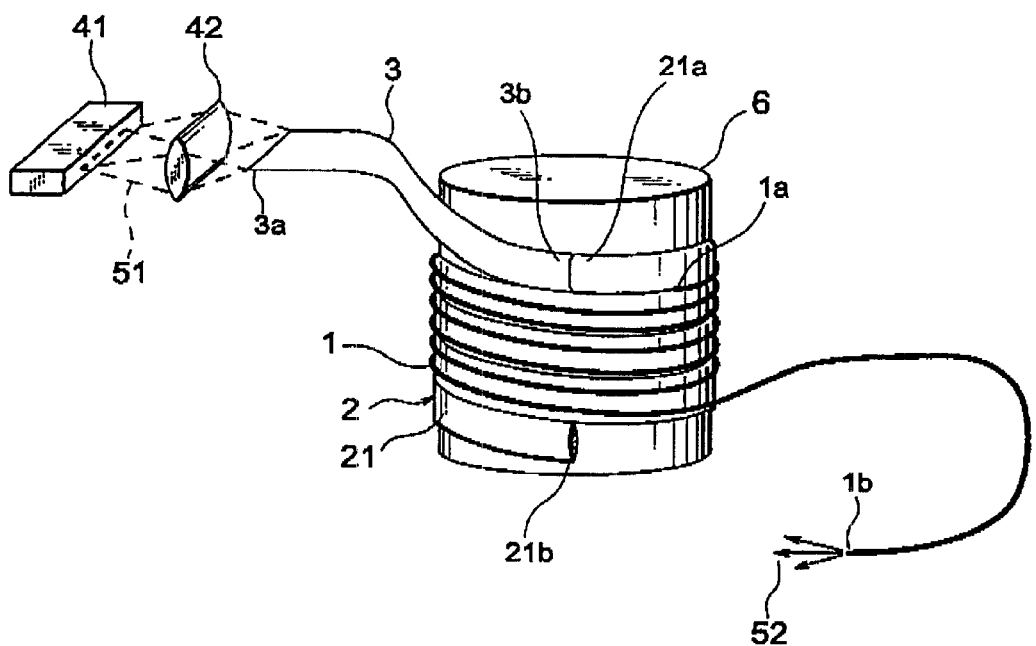
FIG. 1 is a perspective view of a laser device according to a first embodiment of this invention.

Now, description will be made of several preferred embodiments of this invention with reference to the drawing. In the figures, similar parts are designated by like reference numerals.

Referring to FIGS. 1 and 2, a laser device according to a first embodiment of this invention comprises a laser beam guide portion 1 containing a laser active material, an excitation beam guide portion 2 for introducing an excitation beam 51 into the laser beam guide portion 1, and an excitation beam introducing portion 3 for introducing the excitation beam 61 from an excitation source 41 into the excitation beam guide portion 2.

The laser beam guide portion 1 comprises a flexible optical fiber forming a single-series longitudinal or long-sized waveguide structure. The laser beam guide portion 1 in the form of the optical fiber may be called a laser fiber and comprises a core portion containing the laser active material and a cladding portion surrounding the core portion. The laser beam guide portion 1 has one end 1a provided with a reflection surface (reflection end face) formed by a dielectric multilayer film and the other end 1b provided with an output window (output end face) for emitting a laser beam 52 produced by excitation of the laser active material.

The laser beam guide portion 1 is adapted to perform laser oscillation in a single transverse mode by appropriately selecting the diameter of the core portion and the difference in refractive index between the core portion and the cladding portion.

Figure 2A:
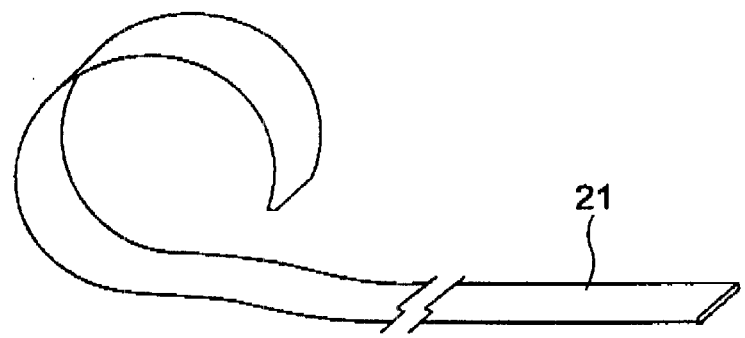
FIGS. 2A through 2C are views for describing an excitation beam guide portion used in the laser device illustrated in FIG. 1.
Figure 2B:
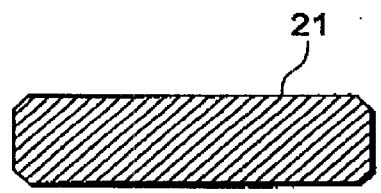
Figure 2C:
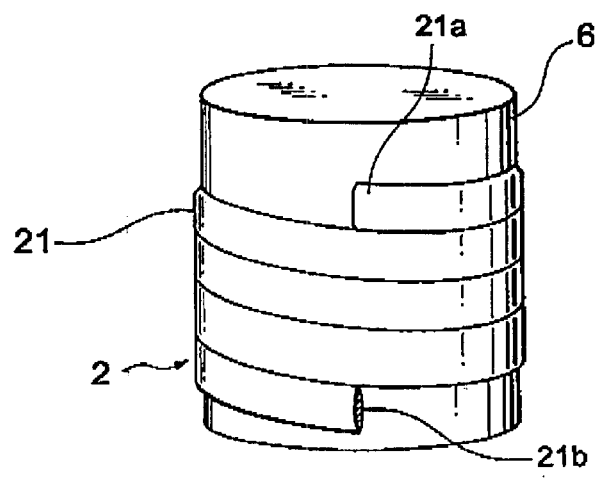

As illustrated in FIGS. 2A through 2C, the excitation beam guide portion 2 is formed by winding or rounding a ribbon-like or a sheet-like flexible beam guide member 21 into a predetermined shape.

Referring to FIGS. 2A through 2C, the flexible beam guide member 21 made of a glass material and having a ribbon-like shape is wound around the outer surface of a cylindrical supporting portion 6 in a helical fashion. Thus, a single integral cylindrical structure is obtained as a whole.

The excitation beam guide portion 2 of a cylindrical shape has a very small thickness because the thickness of the ribbon-like beam guide member 21 corresponds to the thickness of its cylindrical wall.

The beam guide member 21 has one end 21a optically connected to the excitation beam introducing portion 3 so that the excitation beam 51 is introduced through the one end 21a. The beam guide member 21 has the other end 21b provided with a reflection surface (reflection end face) formed by a dielectric multilayer coating or gold plating so that the excitation beam 51 introduced into the excitation beam guide portion 2 does not escape outward through the other end 21b.

The excitation beam guide portion 2 has an outer side surface around which the laser beam guide portion 1 is helically wound. The excitation beam guide portion 2 and the laser beam guide portion 1 are kept in tight optical contact over an optical contact zone having a predetermined length.

The excitation beam introducing portion 3 comprises a ribbon-like beam guide member. The excitation beam introducing portion 3 has one end 3a arranged near the excitation source 41 and the other end 3b kept in face-to-face contact with the one end 21a of the beam guide member 21 forming the excitation beam guide portion 2 to be optically connected thereto. The excitation beam introducing portion 3 is made of a material (silica glass) same as that of the beam guide member 21 forming the excitation beam guide portion 2. The excitation beam introducing portion 3 and the excitation beam guide portion 2 are identical in shape and size in section so that these ends 3b and 21a are exactly fitted to each other.

The excitation source 41 comprises an LD device (laser diode) assembly (LD array or LD bar) including a single column of a number of semiconductor laser diodes (LD devices). The excitation source 41 emits the excitation beam 51 having an intensity distribution linearly spread in a widthwise or transversal direction to be matched with the shape of the end face at the one end 3a of the ribbon-like excitation beam introducing portion 3. Thus, the excitation beam 51 from the excitation source 41 is incident to the one end 3a of the excitation beam introducing portion 3 through a condensing optical system 42 with a high efficiency.

In the above-mentioned laser device, the laser beam guide portion 1 comprises the flexible optical fiber forming the single-series longitudinal waveguide structure. With this structure, the following effects are obtained.

Specifically, by appropriately selecting the diameter of the core portion of the optical fiber as the laser beam guiding portion 1 and the difference in optical refractive index between the core portion and the cladding portion, a single transverse mode of laser oscillation is relatively easily achieved.

In addition, by confining the laser beam within the optical fiber at a high density, it is possible to enhance the interaction between the laser active material and the light beam. Since the length of interaction can be prolonged by increasing the length of the optical fiber, it is possible to generate the laser beam having a high quality in spatial characteristics with a high efficiency. Thus, the laser beam of an excellent quality can be obtained at a relatively low cost.

Furthermore, the excitation beam 51 is confined within the excitation beam guide portion 2 to be introduced into the laser beam guide portion 1 in the distributed state. With this structure, the following effect is obtained in addition to the above-mentioned effects.

The excitation beam 51 is not introduced through the end face of the laser beam guide portion 1 but is distributed in a longitudinal direction of the laser beam guide portion 1 to be introduced through the lateral side thereof. Specifically, the excitation beam guide portion 2 is supplied with the excitation beam 51 emitted from the excitation source 41 and introduced through the excitation beam introducing portion 3. The excitation beam 51 is confined within the excitation beam guide portion 2 by internal reflection and transmitted through the excitation beam guide portion 2. The laser beam guide portion 1 in the form of the optical fiber is wound around the excitation beam guide portion 2 to be brought into optical contact with the surface of the excitation beam guide portion 2 over the optical contact zone having the predetermined length. Thus, the excitation beam 51 confined within the excitation beam guide portion 2 is incident into the laser beam guide portion 1 through the optical contact zone. In response to the excitation beam 51 introduced into the laser beam guide portion 1 in the distributed state, the laser active material contained in the laser beam guide portion 1 can efficiently be excited.

The excitation beam guide portion 2 is formed by winding or rounding the flexible beam guide member 21 of a ribbon-like or a sheet-like shape. With this structure, the following effect is obtained in addition to the above-mentioned effects.

Specifically, by winding or rounding the flexible beam guide member 21, the excitation beam guide portion 2 of a thin structure can be relatively easily produced with a high degree of freedom. Such a thin structure is difficult to obtain by molding or machining an optical material such as a glass.

For example, the excitation beam guide portion 2 in the form of a cylindrical tube must have a wall thickness of 0.5 mm or less, preferably, 100 μm or less in order to improve the excitation efficiency. In this invention, such a thin structure can easily be achieved without resorting to troublesome mechanical machining.

It is thus possible to relatively easily and economically produce the excitation beam guide portion 2 having a beam guide structure capable of confining the excitation beam with a reduced loss and efficiently introducing the excitation beam into the laser beam guide portion in the distributed state.

In the above-mentioned manner, it is possible to provide a laser device, a laser machining device, and an optical amplifier which are capable of increasing an efficiency of exciting a laser active material through an excitation beam guide portion to thereby achieve an increase in output power and output efficiency of a laser beam or an improvement in amplification efficiency at a low cost while keeping inherent merits of distributed introduction of an excitation beam into a longitudinal laser beam guide portion such as a laser fiber, for example, easy achievement of a single transverse mode of laser oscillation and production of a laser beam having a high quality in spatial characteristics at a high efficiency.

By the use of an irradiating unit for irradiating the laser beam 52 emitted from the laser device onto an object to be machined, it is possible to provide a laser machining device having a high efficiency and a high output power.

Furthermore, if the laser beam guide portion 1 excited in the above-mentioned manner is used to perform optical amplification, an optical amplifier of a high efficiency is obtained.

Figure 3:
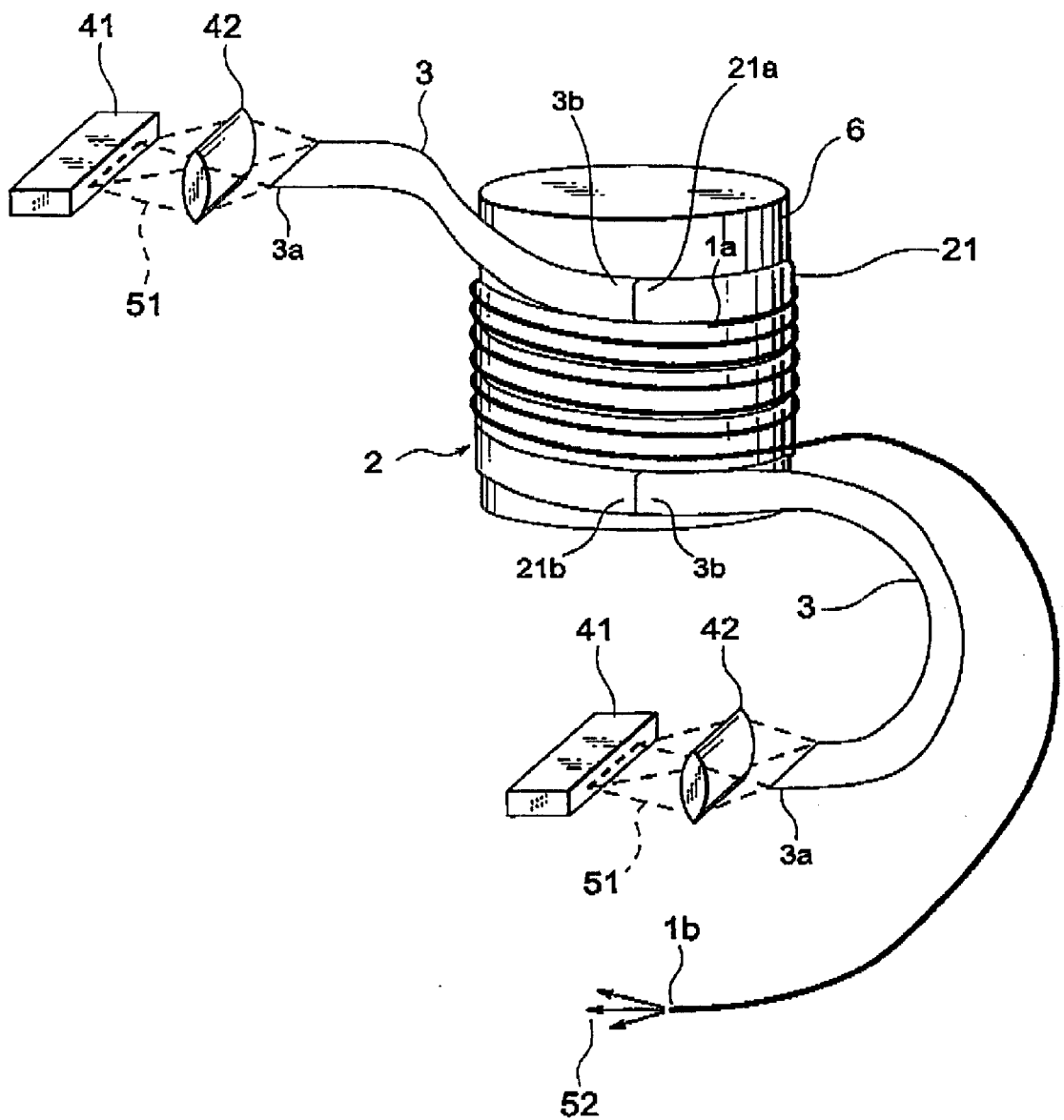
FIG. 3 is a perspective view of a laser device according to a second embodiment of this invention.

Referring to FIG. 3, a laser device according to a second embodiment of this invention will be described.

The laser device illustrated in the figure uses the excitation beam guide portion 2 similar in structure to that described in conjunction with FIGS. 1 and 2A through 2C. In this embodiment, the excitation beam 51 is introduced through each of the one end 21b and the other end 21b of the ribbon-like beam guide member 21 forming the excitation beam guide portion 2.

With this structure, a greater quantity of the excitation beam 51 can be introduced. This brings about the effect of achieving an increase in output power of the laser beam 52.

Figure 4:
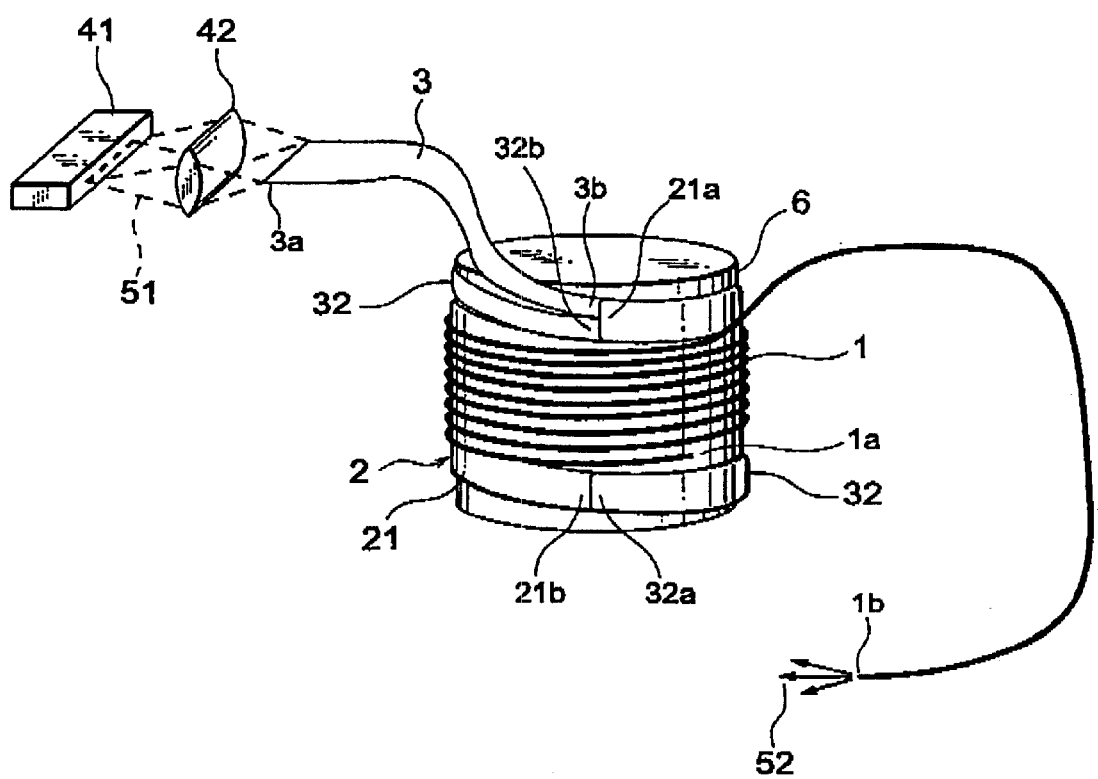
FIG. 4 is a perspective view of a laser device according to a third embodiment of this invention.

Referring to FIG. 4, description will be made to a laser device according to a third embodiment of this invention.

The laser device illustrated in the figure uses the excitation beam guide portion 2 similar in structure to that described in conjunction with FIGS. 1 and 2A through 2C.

The excitation beam guide portion 2 is a cylindrical tube formed by helically winding the ribbon-like beam guide member 21. The excitation beam is introduced into the excitation beam guide portion 2 through the one end 21a of the beam guide member 21 forming the excitation beam guide portion 2. In addition, the excitation beam having reached the other end 21b is re-introduced into the one end 21a to be circulated again.

To this end, a returning beam guide portion 32 is connected between the other end 21b and the one end 21a of the beam guide member 21. The returning beam guide portion 32 has a ribbon-like shape and is flexible. The returning beam guide portion 32 has one end 32a connected face-to-face to the other end 21b of the beam guide member 21 and the other end 32b connected face-to-face to the one end 21a of the beam guide member 21. Thus, tight optical contact is established at each of the above-mentioned connection.

In this case, the one end 21a of the beam guide member 21 is connected to both of the other end 3b of the excitation beam introducing portion 3 and the other end 32b of the returning beam guide portion 32. Therefore, each of the excitation beam introducing portion 3 and the returning beam guide portion 32 is formed into a ribbon-like shape and is tapered so that its width is reduced into half from the one end to the other end.

In FIG. 4, the excitation beam 51 introduced through the one end 21a of the beam guide member 21 is confined and transmitted within the beam guide member 21. During transmission, most of the excitation beam 51 is introduced into the laser beam guide portion 1 in the distributed state. On the other hand, a part of the excitation beam 51 reaches the other end 21b of the beam guide member 21. The excitation beam 51 having reached the other end 21b is transmitted from the one end 32a to the other end 32b of the returning beam guide portion 32 to be re-introduced through the one end 21a of the beam guide member 21.

With the above-mentioned beam guide structure, the excitation beam 51 introduced into the excitation beam guide portion 2 is confined in an endless optical path to be circulated therein. As a result, the introduction of the excitation beam from the excitation beam guide portion 2 into the laser beam guide portion 1 is distributed over an effective length considerably greater than an actual length of the optical contact zone between the excitation beam guide portion 2 and the laser beam guide portion 1. Thus, the area of distributed introduction of the excitation beam 51 from the excitation beam guide portion 2 into the laser beam guide portion 1 can be effectively enlarged.

Therefore, even if a reduced length of the laser beam guide portion 1 is wound, it is possible to efficiently confine the excitation beam in the excitation beam guide portion 2 and transmit the excitation beam therethrough and to efficiently introduce the excitation beam confined as mentioned above into the laser beam guide portion 1 in the distributed state. As a consequence, the laser beam of a high output power can be obtained with a high efficiency by the use of a simple and inexpensive structure.

Figure 5:
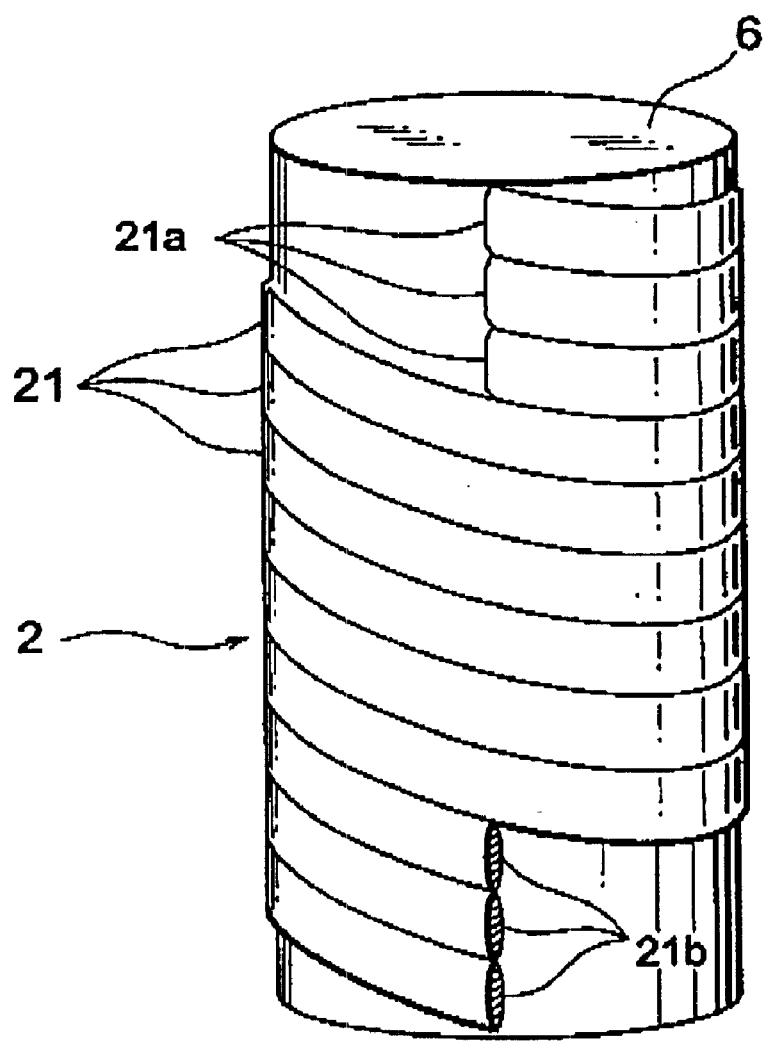
FIG. 5 is a perspective view of another example of the excitation beam guide portion.

Referring to FIG. 5, description will be made of a modification of the excitation beam guide portion 2.

The excitation beam guide portion 2 illustrated in the figure comprises a combination of a plurality of (three) ribbon-like beam guide members 21 arranged in parallel and adjacent to one another in the transversal or widthwise direction to be coplanar with each other in the transversal direction. The beam guide members 21 in combination are helically wound around the supporting portion 6 to obtain the excitation beam guide portion 2 in the form of a single cylindrical tube.

In the above-mentioned excitation beam guide portion 2, the excitation beam is introduced through the one ends 21a of the beam guide members 21 or both of the one ends 21a and the other ends 21b.

In case where the excitation beam is introduced through both of the one ends 21a and the other ends 21b, the excitation beam introducing portion 3 as illustrated in FIG. 1 is connected to each of the one ends 21a and the other ends 21b.

In case where the excitation beam is introduced only through the one ends 21a of the beam guide member 21, each of the other ends 21b is provided with the reflection surface (reflection end face) for reflecting the excitation beam.

As mentioned above, a plurality of the beam guide members 21 are combined to form the single excitation beam guide portion 2 and the excitation beam is introduced into each of the beam guide members 21. With this structure, it is possible to introduce a greater quantity of the excitation beam. Therefore, the excitation beam guide portion 2 is particularly adapted to form a high-output laser device for use as the laser machining device.

By winding the beam guide members 21 without a gap therebetween in the transversal direction and by optically connecting adjacent lateral sides thereof to each other, the beam guide members 21 in combination can be used as a single beam guide member of a large width.

Figure 6:
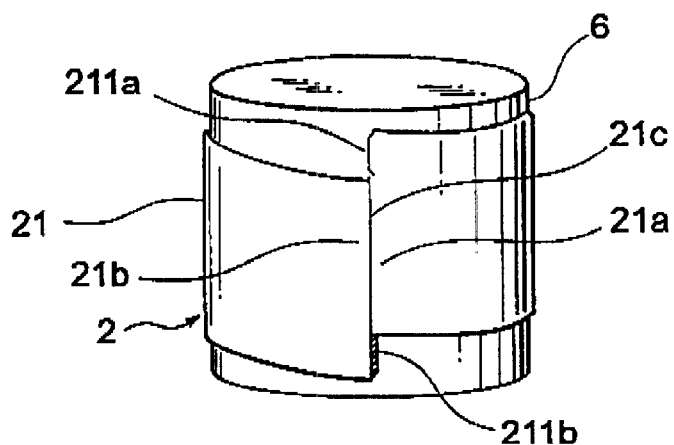
FIG. 6 is a perspective view of still another example of the excitation beam guide portion.

Referring to FIG. 6, description will be made of a modification of the excitation beam guide portion 2.

The excitation beam guide portion 2 illustrated in the figure comprises a sheet-like flexible beam guide member 21 which is rounded in a single turn around a body of the cylindrical supporting portion 6 to form a generally cylindrical tube.

In this case, the sheet-like beam guide member 21 is rounded in a slightly oblique direction so that the both ends 21a and 21b are brought into face-to-face contact with each other and that contacting surfaces (end faces) 21c at the both ends 21a and 21b are slightly offset from each other in the transversal direction. Specifically, the sheet-like beam guide member 2 is rounded so that the contacting surfaces 21c at the both ends 21a and 21b have offset surfaces 211a and 211b, respectively. The excitation beam can be introduced through the offset surface 211a and/or the offset surface 211b.

The width of each of the offset surfaces 211a and 211b can be given any desired value by selecting a rounding direction of the sheet-like beam guide member 21. Specifically, the width of each of the offset surfaces 211a and 211b is varied in dependence upon the inclination of the rounding direction with respect to a cylindrical axis of the supporting portion 6.

Thus, the width of introduction of the excitation beam at each of the offset surfaces 211a and 211b can be selected to any desired value by the manner of rounding the sheet-like beam guide member 21. If it is desired to introduce a greater quantity of the excitation beam so as to obtain a high output power, the sheet-like beam guide member 21 is rounded with a relatively steep inclination so that the width of each of the offset surfaces 211a and 211b becomes large.

On the other hand, if it is desired to efficiently confine the excitation beam, the sheet-like beam guide member 21 is rounded with a relatively gentle inclination so that the width of each of the offset surfaces 211a and 211b becomes small.

The excitation beam may be introduced into both or one of the offset surfaces 211a and 211b formed at the one end 21a and the other end 21b of the sheet-like beam guide member 21. In dependence upon a target laser output level, selection is appropriately made.

The contacting surfaces 21c of the sheet-like beam guide member 21 may be optically connected so as to allow the passage of the excitation beam. Alternatively, the contacting surfaces 21c may formed so that the excitation beam is reflected at the contacting surfaces 21 to reverse its advancing direction. In order to optically connect the contacting surfaces 21c, the contacting surfaces 21c may be bonded to each other by fusion bonding or by the use of resin (adhesion or molding) to obtain mechanical and optical connection therebetween.

The excitation beam guide portion 2 with the contacting surfaces 21c optically connected to each other may be formed by the use of the ribbon-like beam guide member 21. Specifically, the ribbon-like beam guide member 21 is helically wound to form a cylindrical tube and adjacent portions of the beam guide member 21 in a wound state are bonded by fusion bonding or by the use of resin.

Figure 7A:
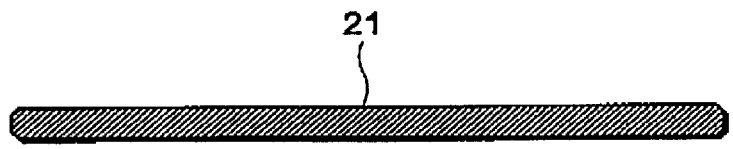
FIGS. 7A through 7C are sectional views of various structures of a sheet-like beam guide member forming the excitation beam guide portion.
Figure 7B:
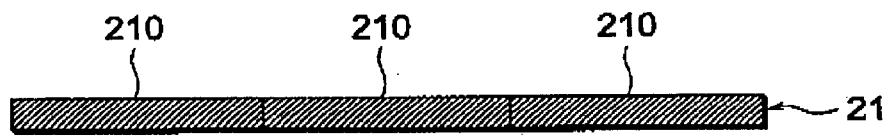
Figure 7C:

Referring to FIGS. 7A through 7C, the sheet-like beam guide member 21 will be described more in detail.

For example, the sheet-like beam guide member 21 used to form the excitation beam guide portion 2 illustrated in FIG. 6 may comprise a single component as illustrated in FIG. 7A alternatively, the sheet-like beam guide member 21 may comprise a plurality of beam guide members 210 arranged to be coplanar with one another in the transversal direction as illustrated in FIGS. 7B and 7C. In FIG. 7B, the sheet-like beam guide member 21 comprises a combination of a plurality of ribbon-like beam guide members 210. In FIG. 7C. the sheet-like beam guide member 210 comprises a combination of a number of wire-like beam guide members 210. The beam guide members 210 are mechanically and optically connected to one another by fusion bonding or by the use of resin (adhesion or molding).

Figure 8A:
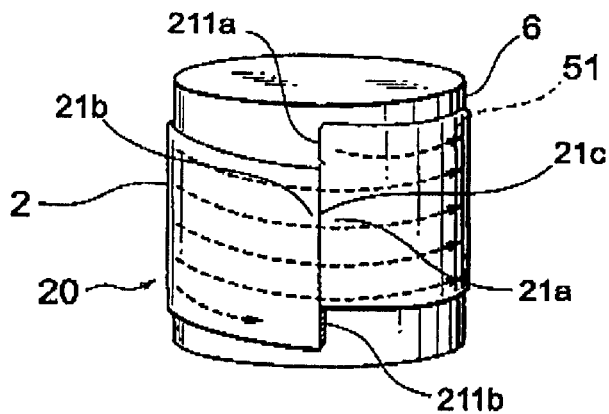
FIGS. 8A and 8B are a perspective view and a development view for describing an beam guide structure of the excitation beam guide portion having an annular structure, respectively.
Figure 8B:
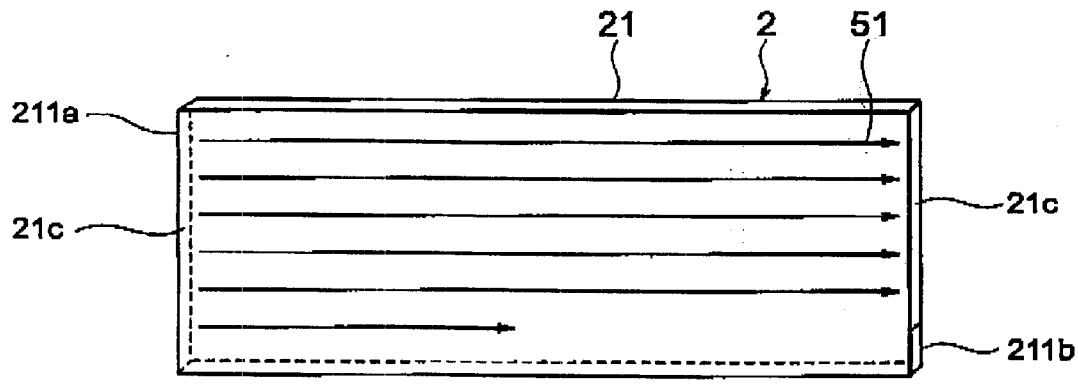

Referring to FIGS. 8A and 8B, description will be made of the beam guide stature of the excitation beam guide portion 2 having an annular structure.

For example, in the excitation beam guide portion 2 in the form of a cylindrical tube illustrated in FIG. 6, the both ends 21a and 21b of the sheet-like beam guide member 21 are brought into face-to-face contact with each other to form a kind of the annular structure. In the excitation beam guide portion 2 having the annular structure, the both ends 21a and 21b of the sheet-like beam guide member 21 are brought into face-to-face contact with each other in the manner such that the offset surfaces 211a and 211b are formed. Furthermore, the contact surfaces 21c are optically connected by fusion bonding, by the use of resin (adhesion or molding), or by optical contact. This provides the beam guide structure in which the excitation beam 51 introduced through the one offset surface 211a is annularly advanced to circulate throughout the excitation beam guide portion 2, as depicted by arrows in FIGS. 8A and 8B.

Figure 9A:
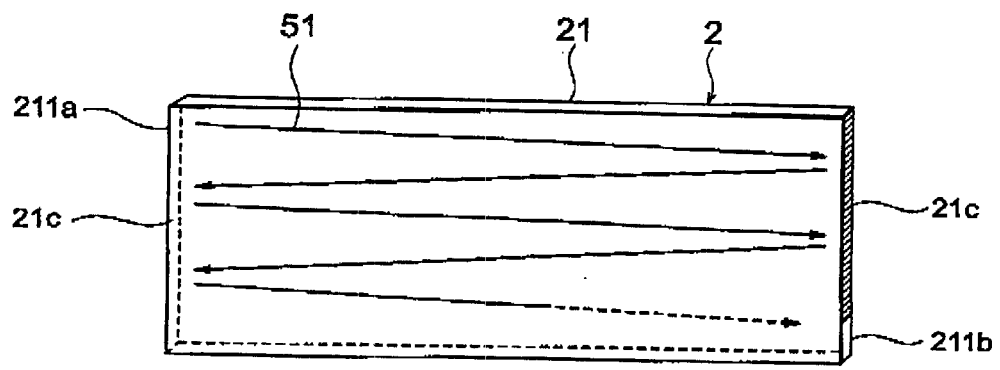
FIGS. 9A and 9B are development views for describing different beam guide structures of the excitation beam guide portion having an annular structure.
Figure 9B:
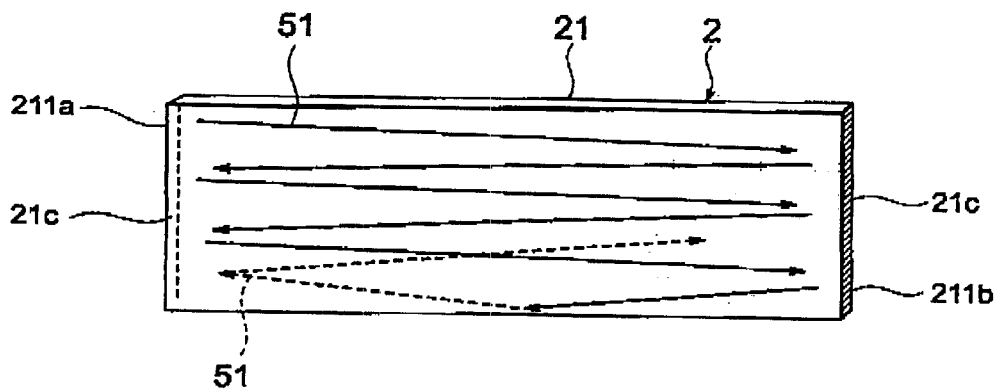

The excitation beam guide portion 2 having such an annular structure may have another beam guide structure illustrated in FIGS. 9A and 9B.

Referring to FIGS. 9A and 9B, description will be made of another beam guide structure of the excitation beam guide portion 2 having the annular structure.

Referring to FIG. 9A, the both ends 21a and 21b of the sheet-like beam guide member 21 are brought into face-to-face contact with each other so that the offset surfaces 211a and 211b are formed. The contacting surfaces 21c are subjected to mirror polishing or gold plating to be treated into optical reflection surfaces.

With this structure, the excitation beam introduced into the excitation beam guide portion 2 is advanced in the advancing direction along the winding or the rounding direction of the beam guide member 21 forming the excitation beam guide portion 2, as depicted by arrows in the figure. The advancing direction is cyclically reflected and reversed to circulate the excitation beam throughout the excitation beam guide portion 2. The above-mentioned beam guide structure is advantageous in that a high confinement efficiency is achieved with respect to the size of the excitation beam guide portion 2 because the optical path of the excitation beam 51 within the excitation beam guide portion 2 can be increased in length. Furthermore, it is possible to effectively enlarge the area of distributed introduction of the excitation beam from the excitation beam guide portion 2 into the laser beam guide portion 1.

Referring to FIG. 9B, the offset surface 211b located at the outlet of the excitation beam 51 in FIG. 9A is closed by the optical reflection surface.

In this case, the excitation beam 51 introduced through the one offset surface 211a circulates throughout the excitation beam guide portion 2 and, when it reaches the other offset surface 211b, is reflected and reversed in the advancing direction to again circulate through the excitation beam guide portion 2, as depicted by arrows in the figure. As a consequence, the optical path of the excitation beam 51 within the excitation beam guide portion 2 can be considerably increased in length. Therefore, even if the excitation beam guide portion 2 is reduced in size, the excitation beam 51 can be confined with a high efficiency. Furthermore, it is possible to effectively enlarge the area of distributed introduction of the excitation beam 51 from the excitation beam guide portion 2 into the laser beam guide portion 1. Therefore, even if the laser beam guide portion 1 is reduced in length, the excitation beam 51 can efficiently be introduced in the distributed state.

Figure 10A:
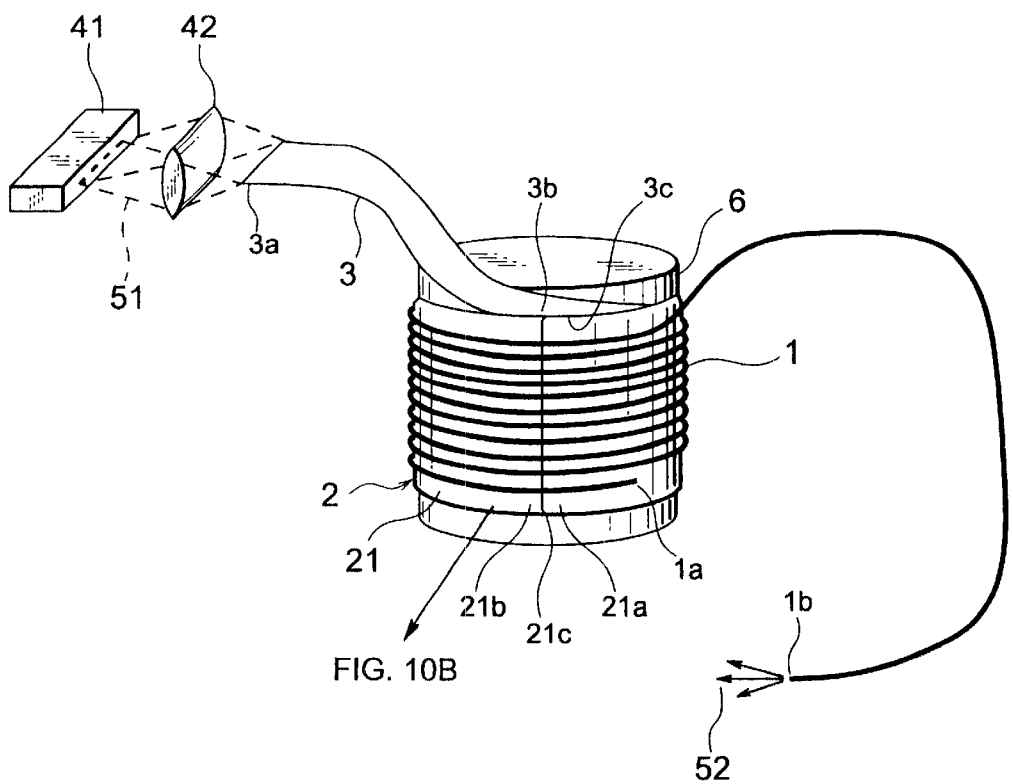
FIG. 10 is a perspective view of another example of the excitation beam guide portion having an annular structure.
Figure 10B:
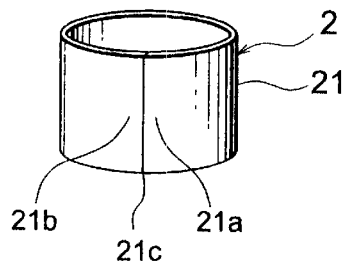

Referring to FIG. 10, description will be made of a modification of the excitation beam guide portion 2 having the annular structure.

The excitation beam guide portion 2 illustrated in the figure is formed into a cylindrical tube of a closed structure. Specifically the both ends 21a and 21b of the sheet-like beam guide member 21 are brought into face-to-face contact to completely overlap each other so that no offset surfaces are formed.

As illustrated in FIG. 10, the excitation beam 51 can be efficiently introduced into the excitation beam guide portion 2 of the above-mentioned structure by the use of the ribbon-like excitation beam introducing portion 3 having the other end 3b in a sharply tapered shape. The ribbon-like excitation beam introducing portion 3 is formed by drawing or wire-drawing a silica glass material into a ribbon-like shape. The excitation beam 51 is introduced from the excitation source 41 through the condensing optical system 42 to the one end 3a of the ribbon-like excitation beam introducing portion 3. The other end 3b is cut into the sharply tapered shape to form a taper cut surface 3c. The taper cut surface 3c is brought into tight optical contact with an opening end face of the excitation beam guide portion 2 in the form of the cylindrical tube; Thus, the excitation beam 51 transmitted through the excitation beam introducing portion 3 is smoothly introduced into the excitation beam guide portion 2 through the taper cut surface 3c.

Figure 11A:
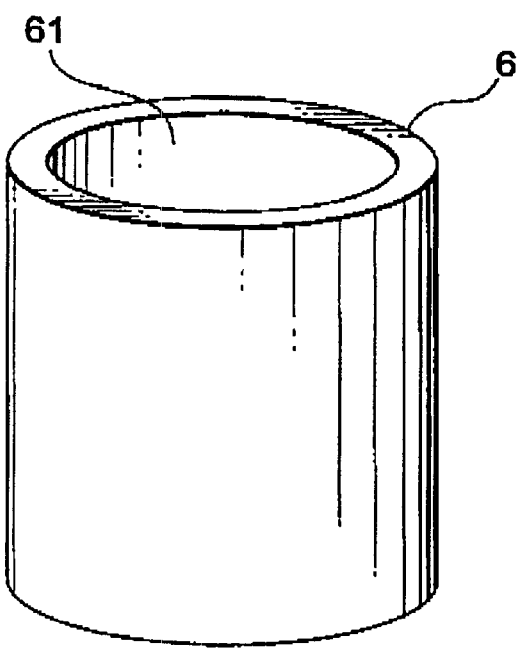
FIGS. 11A and 11B are perspective views showing examples of a supporting portion around which the beam guide member is wound or rounded.
Figure 11B:
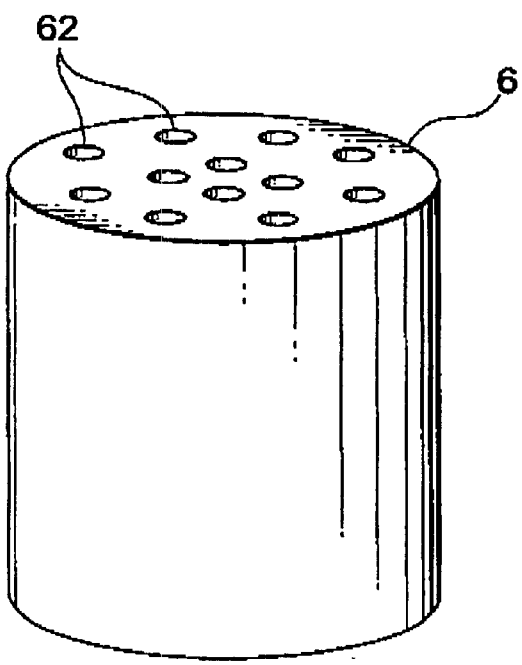

Referring to FIGS. 11A and 11B, description will be made of the supporting portion 6 around which the beam guide member 21 is wound or rounded.

In case where the excitation beam guide portion 2 of a predetermined shape is formed by winding or rounding the beam guide member 21, this process can be facilitated by the use of the supporting portion 6 matching the predetermined shape to be formed. The supporting portion 6 serves to maintain and reinforce the shape of the structure formed by winding or rounding the beam guide member 21. In addition, the supporting portion 6 can serve as a radiator for promoting heat release.

The supporting portions 6 illustrated in FIGS. 11A and 11B have a function as the radiator.

Referring to FIG. 11A, the supporting portion 6 comprises an excellent heat conductor, such as aluminum or copper, having a heat conductivity greater than that of the glass as the material of the excitation beam guide portion 2. The supporting portion 6 has a hollow cylindrical shape opened at both ends. With this structure, the radiation effect is improved because the radiation area is increased and the flow of a cooling medium such as air is promoted. The supporting portion 6 has a hollow portion 61.

Referring to FIG. 11B, the supporting portion 6 comprises an excellent heat conductor in the form of a solid cylinder which is large in heat absorption volume. The supporting portion 6 is provided with a plurality of radiating holes 62 penetrating the solid cylinder in its axial direction and substantially uniformly distributed. With this structure, the radiation effect by the increase in radiation area and the promotion of flow of the cooling medium is further improved.

In order to increase the radiation effect of the supporting portion 6, use may be made of not only the material, such as aluminum or copper, having a high heat conductivity but also a structural radiator such as a heat pipe.

Figure 12:
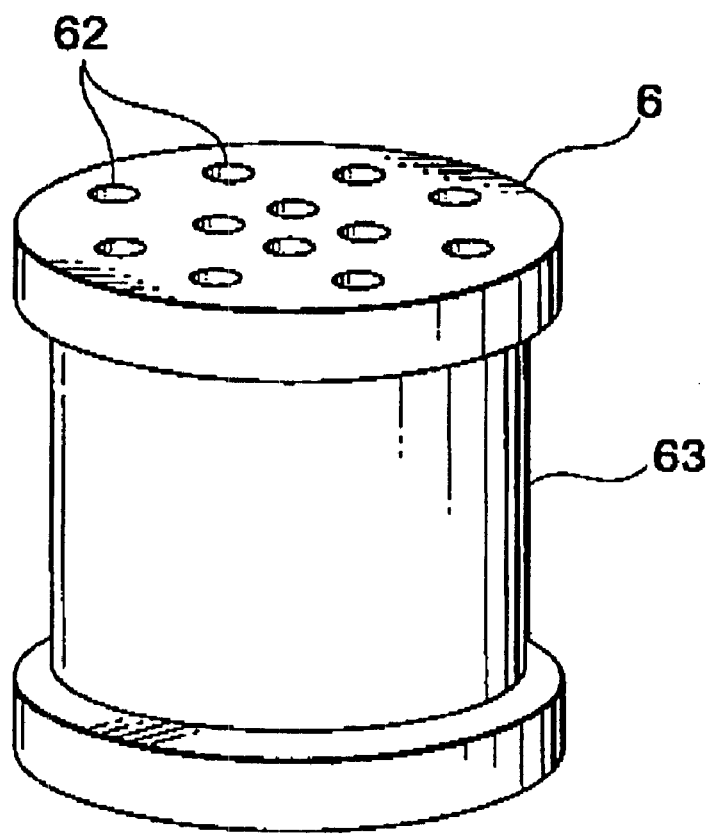
FIG. 12 is a perspective view showing another example of the supporting portion.

Referring to FIG. 12, description will be made of a modification of the supporting portion 6 around which the beam guide member 21 is wound or rounded.

The supporting portion 6 illustrated in the figure is provided with a guide groove 63 formed at a portion where the beam guide member 21 is wound or rounded. It is thus possible to improve the workability and the repeatability upon winding or rounding the beam guide member 21.

Figure 13A:
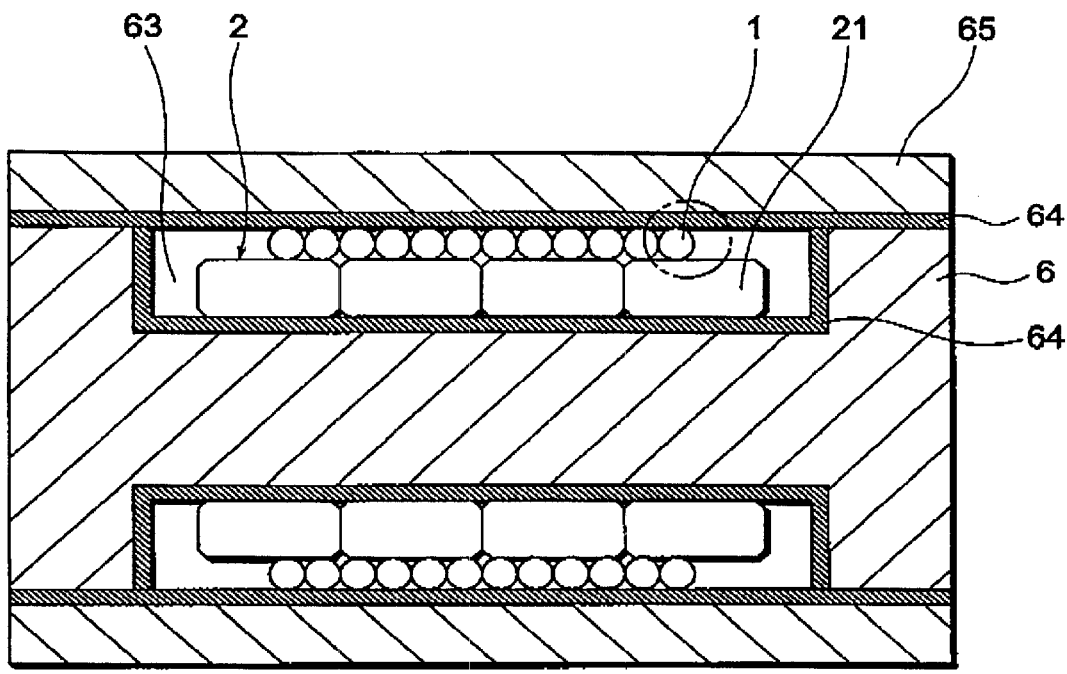
FIGS. 13A and 13B are sectional views for describing the use of the supporting portion having a guide groove.
Figure 13B:
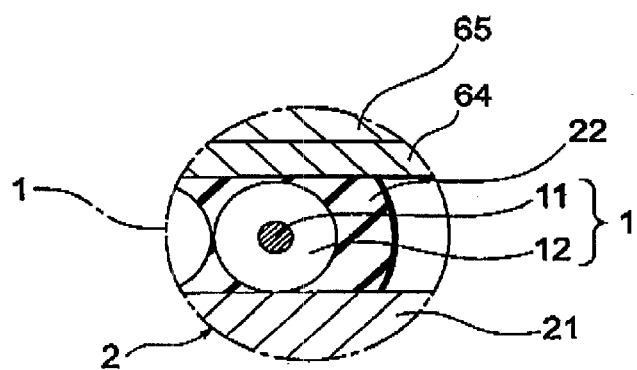

Referring to FIGS. 13A and 13B, description will be made of the use of the supporting member 6 having the guide groove 63.

The supporting member 6 illustrated in the figure has the guide groove 63 formed at a region where the beam guide member 21 is wound or rounded. The guide groove 63 has inner surfaces (bottom surface and side surfaces of the groove) coated with a reflection coating layer 64 forming a reflection surface. The reflection coating layer 64 is formed by gold plating the inner surfaces of the guide groove 63 to obtain gold plated surfaces and then uniformly coating the gold plated surfaces with a resin material having a refractive index (about 1.38) lower than that of the silica glass material.

The ribbon-like beam guide member 21 is wound around the guide groove 63 to form the excitation beam guide portion 2. Around the outer surface of the excitation beam guide portion 2, the laser beam guide portion (laser fiber) 1 is wound. The laser beam guide portion 1 has the core portion 11 and the cladding portion 12 both of which are made of silica glass. A resin material 22 having a refractive index (about 1.46) substantially equal to that of the silica glass material is applied in the region where the laser beam guide portion 1 is wound to embed the laser beam guide portion 1.

The outer surface of the laser beam guide portion 1 is covered with a cover member 65. The cover member 65 has an inner surface coated with the above-mentioned reflection coating layer 64.

In the laser device having the above-mentioned structure, the refractive index of the resin material 22 covering the laser beam guide portion 1 is substantially equal to that of the silica glass material. Therefore, the excitation beam 51 confined within the excitation beam guide portion 2 and transmitted therethrough can be introduced through the resin material 22 into the cladding portion 12 of the laser beam guide portion 1 with a high probability. Then, the laser active material contained in the core portion 11 can be efficiently excited through the cladding portion 12 to perform laser oscillation or amplification.

Since the reflection coating layer 64 is formed on both of the guide groove 63 and the cover member 65, a whole of the excitation beam guide portion 2 formed by winding or rounding the beam guide member 21 and the laser beam guide portion 1 wound around the excitation beam guide portion 2 in optical contact therewith can be optically confined. With this structure, the leakage of the excitation beam can substantially completely be inhibited to improve the excitation efficiency.

Figure 14:
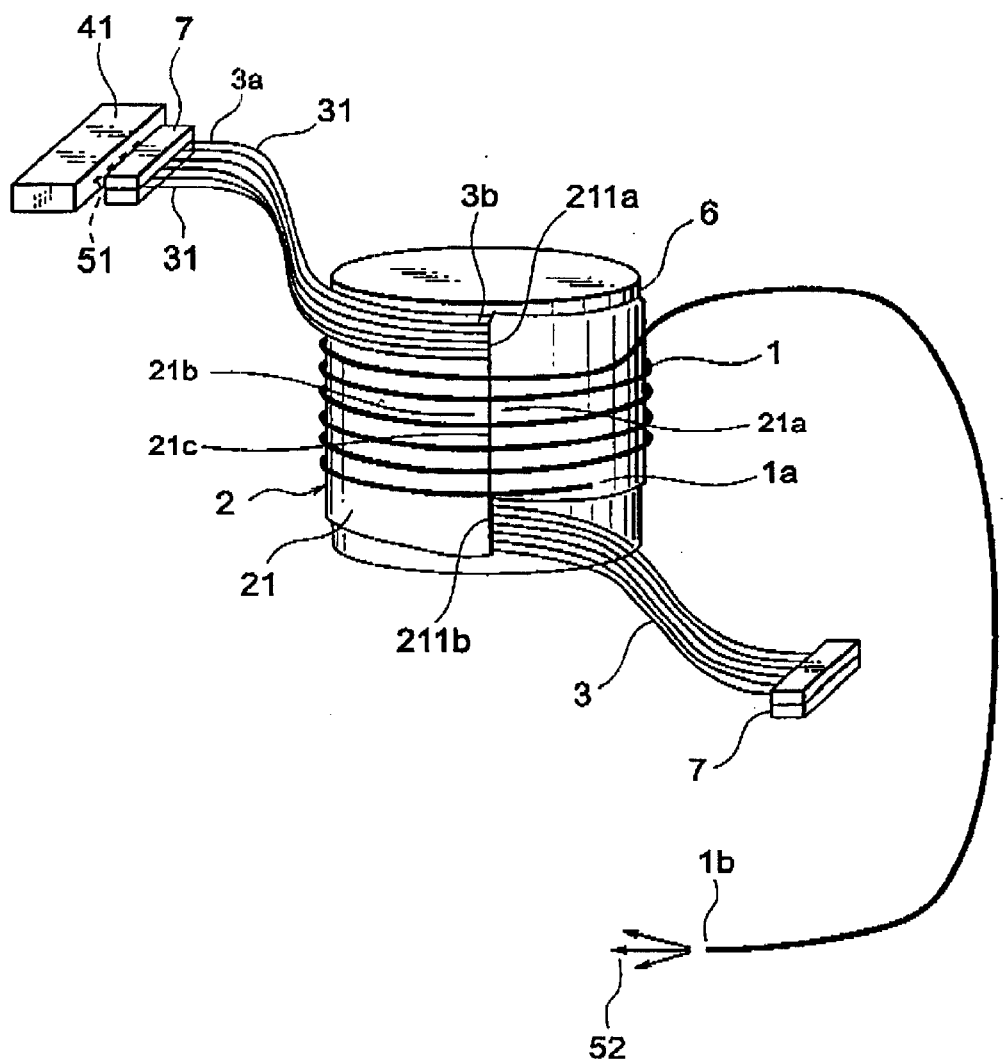
FIG. 14 is a perspective view of another example of an excitation beam introducing portion.

Referring to FIG. 14, description will be made of a modification of the excitation beam introducing portion 3.

The excitation beam introducing portion 3 for introducing the excitation beam from the excitation source 41 to the excitation beam guide portion 2 can be formed not only by the ribbon-like beam guide member but also by the use of a number of optical fibers 31 as illustrated in FIG. 14.

In the laser device illustrated in the figure, output beams from the LD device assembly (LD bar or LD array) as the excitation source 41 of the laser device are guided from the individual LD devices through the optical fibers 31 to the excitation beam guide portion 2, respectively.

In this event, one end face of each of the optical fibers 31 and an emission surface of each corresponding one of the LD devices must accurately be positioned face to face to each other. To this end, use is made of a positioning jig 7. Although not illustrated in detail, the positioning jig 7 has a plurality of guide grooves formed at a predetermined pitch. Each groove has a V-shaped section of an angle of 90°. The one ends of the optical fibers 31 are positioned in these guide grooves, respectively.

In the example being illustrated in the figure, use is made of the excitation beam guide portion 2 in the form of a generally cylindrical tube obtained by rounding a single piece of the sheet-like beam guide member 21 and bringing the both ends 21a and 21b into face-to-face contact to each other to leave the offset surfaces 211a and 211b, as illustrated in FIGS. 6, 7A through 7C, and 8A and 8B.

Both of the offset surfaces 211a and 211b are used as introduction ports for the excitation beam. Each of the offset surfaces 211a and 211b is connected to the other end of a corresponding one, of the optical fibers 31 by fusion bonding to introduce the excitation beam.

Figure 15:
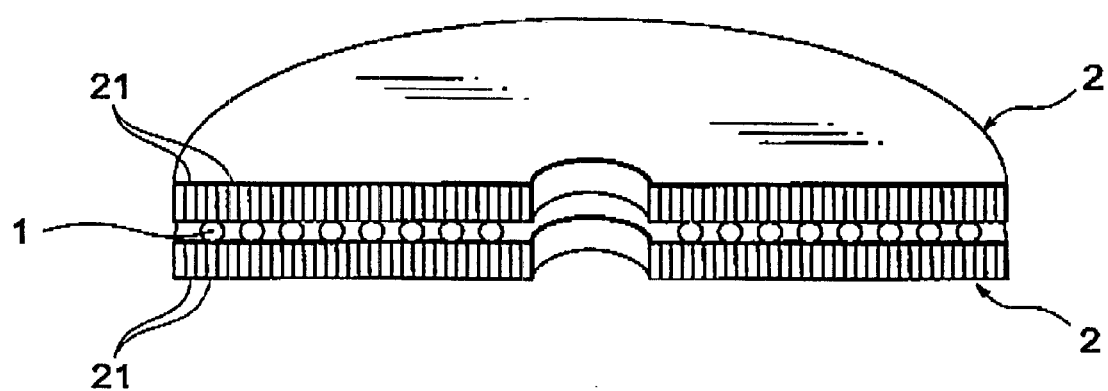
FIG. 15 is a partially-broken perspective view showing a different shape of the excitation beam guide portion.

Referring to FIG. 15, description will be made of a modification of the excitation beam guide portion 2.

As illustrated in the figure, the beam guide member 21 in the form of a narrow ribbon or a wire is spirally wound within a single common plane. Thus, the excitation beam guide portion 2 of a flat disk shape can relatively easily be obtained. For example, the laser beam guide portion 1 spirally wound is interposed between the disk-shaped excitation beam guide portions 2 mentioned above to thereby form the laser device. Thus, the excitation beam guide portion 2 may be formed not only into the cylindrical tube but also into the disk shape. The beam guide member 21 forming the excitation beam guide portion 2 may have various shapes, such as a ribbon-like shape, a sheet-like shape, and a wire-like shape.

The beam guide member 21 mentioned above is typically made of the silica glass material. However, the beam guide member 21 may be made of any other appropriate material as far as it is transparent to the excitation beam. For example, use may be made of fluororesin or plastics.

In the foregoing, the ribbon-like beam guide member 21 is uniform in width and thickness. However, the ribbon-like beam guide member 21 may be variable in width and thickness in correspondence to the shape of the supporting portion 6.

In order to introduce the excitation beam into the excitation beam guide portion 2, the ribbon-like excitation beam introducing portion 3 and the optical fibers 31 are used in the foregoing embodiments. Alternatively, use may be made of any other appropriate means such as a prism or a diffraction grating.

In the foregoing, various preferred embodiments have been described in conjunction with the drawing. It will be noted here that this invention is put into practice in various manners including the above-mentioned embodiments.

(1) In a fiber laser device comprising an excitation beam guide portion for confining an excitation beam and transmitting the excitation beam therethrough, and a fiber-shaped laser beam guide portion containing a laser active material for emitting a laser beam when it is excited by the excitation beam introduced from the excitation beam guide portion into the laser beam guide portion in a distributed state, the excitation beam guide portion is formed by winding or rounding a beam guide member adapted to confine at least the excitation beam around a supporting portion of a predetermined shape in press contact therewith.

For example, the above-mentioned beam guide member has a fiber-shaped shape, a ribbon-like shape, or a sheet-like shape and is formed in a long size or a small thickness to have a flexibility. The beam guide member is wound or rounded around the supporting portion to form the excitation beam guide portion having a predetermined shape and an integral structure in which the adjacent portions thereof are brought into tight contact with one another.

The laser beam guide member comprises a so-called optical fiber comprising a cladding portion and a core portion containing a laser active material. Thus, a so called laser fiber is formed.

At least a part of the laser fiber and the excitation beam guide portion are, directly or indirectly through an optical medium, brought into contact with each other at an optical contact zone. The laser active material is excited by the excitation beam incident through the optical contact zone.

(2) In the fiber-type laser device mentioned above, the excitation beam guide portion has a shape determined by the shape of the supporting portion around which the beam guide member forming the excitation beam guide portion is wound or rounded. Thus, the excitation beam guide portion is formed by the use of the supporting portion as a base.

The supporting portion may have a cylindrical shape, a shape variable in section along a center axis (for example, a conical shape, a frustoconical shape, a barrel-like shape, or a spool-like shape), or a disk shape. Thus, the excitation beam guide portion of a predetermined structure can be obtained by efficiently winding or rounding the beam guide member of a fiber-shaped shape, a ribbon-like shape, or a sheet-like shape.

(3) In the fiber laser device mentioned above, the beam guide member forming the excitation beam guide portion has a refractive index substantially equal to or slightly smaller than that of the cladding portion of the laser beam guide portion (laser fiber).

By selecting the refractive indices of the beam guide member and the laser beam guide portion as mentioned above, the excitation beam transmitted within the beam guide member is readily incident into the cladding portion of the laser beam guide portion. As a consequence, it is possible to improve the excitation efficiency of the laser active material contained in the core portion.

By the use of the same material for both of the beam guide member and the laser beam guide portion, optical characteristics such as the refractive index can be matched therebetween as well as thermal and mechanical characteristics. It is therefore possible to avoid the occurrence of unfavorable stress resulting from thermal expansion.

(4) In the above-mentioned fiber laser device, the beam guide member forming the excitation beam guide portion is wound or rounded around the supporting portion via a less refractive layer having a refractive index smaller than that of the beam guide member.

Presence of the less refractive layer having the small refractive index between the beam guide member and the supporting portion, the leakage of light towards the less refractive layer is suppressed. Since the beam guide member is not brought into direct contact with the material forming the supporting portion, it is possible to avoid unnecessary absorption of light into the supporting portion. As a consequence, a greater quantity of the excitation beam can be transmitted to the laser beam guide portion to thereby enhance the excitation efficiency of the laser active material contained in the laser beam guide portion.

(5) In the above-mentioned fiber laser device, the supporting portion is provided with reflecting means formed on its surface for reflecting at least the excitation beam.

Since the reflecting means for reflecting the excitation beam is provided on the surface of the supporting portion around which the beam guide member is wound or rounded, the excitation beam undesirably transmitted out of the beam guide member towards the supporting member can be reflected back towards the laser beam guide portion. Thus, the excitation beam can be fully and efficiently utilized.

(6) In the above-mentioned fiber laser device, at least a part of each of the excitation beam guide portion and the laser beam guide portion kept in contact with its surface is covered with reflecting means adapted to reflect the excitation beam.

By covering the excitation beam guide portion and the laser beam guide portion with the reflecting means for reflecting the excitation beam, the excitation beam leaking from the excitation beam guide portion or the laser beam guide portion can be recycled for excitation.

(7) In the above-mentioned laser fiber device, the excitation beam is incident through the end face of the beam guide member of a fiber-shaped shape, a ribbon-like shape, or a sheet-like shape.

Since the excitation beam is incident through the end face of the beam guide member of a fiber-shaped shape, a ribbon-like shape, or a sheet-like shape, it is unnecessary to provide the beam guide member with additional means for incidence of the excitation beam. In addition, it is possible to suppress the probability that the excitation beam escapes outward from the inlet after it is incident. Thus, the excitation beam can efficiently be utilized.

(8) In the above-mentioned fiber laser device, the flexible excitation beam introducing portion of a fiber-shaped shape, a ribbon-like shape, or a sheet-like shape is connected by fusion bonding to any desired surface (for example, a front surface, a back surface, a side surface, or an end surface) of the beam guide member of a fiber-shaped shape, a ribbon-like shape, or a sheet-like shape. Through the excitation beam introducing portion connected as mentioned above, the excitation beam is introduced into the excitation beam guide portion.

With the above-mentioned structure, the excitation beam can be introduced with a reduced loss. By the use of the flexible excitation beam introducing portion of a fiber-shaped shape, a ribbon-like shape, or a sheet-like shape, the degree of freedom upon connection with the excitation source can be increased.

(9) In the above-mentioned fiber laser device, the excitation beam is introduced into the excitation beam guide portion through the one end face of the beam guide member forming the excitation beam guide portion and, if it reaches the other end face, is reflected to be returned.

Thus, the length of the optical path of the excitation beam within the excitation beam guide portion can effectively be increased to improve the confinement efficiency of the excitation beam and to efficiently introduce the excitation beam into the laser beam guide portion in the distributed state.

(10) In the above-mentioned fiber laser device, the excitation beam guide portion comprises a plurality of beam guide members. The guide member (beam guide member) has a fiber-shaped shape, a ribbon-like shape, or a sheet-like shape.

Since the excitation beam guide portion comprises a plurality of beam guide members, the degree of freedom in the structure of the excitation beam guide portion is increased, in addition, since the excitation beam can be incident through the both end faces of each of the beam guide members, a greater quantity of the excitation beam can be used. This makes it possible to achieve the laser fiber device having high output power.

(11) In the above-mentioned fiber laser device, the guide groove for guiding the fiber-shaped laser beam guide portion is formed so as to obliquely traverse the beam guide member of a fiber-shaped shape, a ribbon-like shape, or a sheet-like shape.

Since the guide groove matching the winding pitch of the laser beam guide portion (laser fiber) is formed on the surface of the beam guide member of a fiber-shaped shape, a ribbon-like shape, or a sheet-like shape forming the excitation beam guide portion, the laser beam guide portion can be accurately and stably wound at a predetermined pitch irrespective of the winding pitch of the beam guide member or without being disturbed by the winding direction of the beam guide member.

(12) In the above-mentioned fiber laser device, the excitation beam guide portion comprises the sheet-like beam guide member rounded in an annular shape with its both end faces kept in face-to-face contact. The contact surfaces are connected to each other by fusion bonding.

Since the both end faces of the sheet-like beam guide member are kept in face-to-face contact and connected by fusion bonding to each other, the contact surfaces can be optically smoothly connected. Thus, the excitation beam guide portion can confine and circulate the excitation beam with a reduced loss.

(13) In the above-mentioned laser fiber device, the excitation beam guide portion comprises the sheet-like beam guide member rounded in an annular shape with its both end faces kept in face-to-face contact. The contact surfaces are provided with high reflection films.

By providing the high reflection films on the contact surfaces, the excitation beam is folded back and passes through the optical path increased in effective length until the excitation beam reaches a terminal end of the sheet-like beam guide member. This makes it possible to reduce the size of the excitation beam guide portion.

(14) In the above-mentioned fiber laser device, the excitation beam guide portion is formed by winding or rounding the beam guide member of a fiber-shaped shape, a ribbon-like shape, or a sheet-like shape in an annular fashion. The both end faces of the sheet-like beam guide member are entirely or partially kept in face-to-face contact. The contact surfaces are optically coupled.

By optically coupling the both end faces of the beam guide member, the excitation beam having been incident into the excitation beam guide portion advances in the same direction and circulates within the excitation beam guide portion until it is introduced from the excitation beam guide portion into the laser beam guide portion in the distributed state to be absorbed into the laser active material.

Thus, the excitation beam having been incident into the excitation beam guide portion is effectively utilized for excitation of the laser active material without leaking outward through the inlet.

By increasing the number of circulations of the excitation beam, the laser beam guide portion (laser fiber) can be reduced in length. It is thus possible to reduce the loss within the laser beam guide portion and to decrease the cost for the laser fiber.

(15) In the above-mentioned fiber laser device, the supporting portion around which the beam guide member is wound or rounded is made of a material higher in thermal conductivity or heat radiation than the laser beam guide portion.

It is therefore possible to efficiently release the heat produced by absorption of the excitation beam into the excitation beam guide portion. As a consequence, the stability and the reliability can be improved.

(16) In the above-mentioned fiber laser device, the excitation beam guide portion is formed by the use of the supporting portion which is thereafter removed.

By removing the supporting portion, the excitation beam guide portion is improved in degree of freedom in its structure and is readily kept in storage.

(17) In the above-mentioned fiber laser device, the support portion is provided with the guide groove formed on its surface to receive the beam guide member wound or rounded therearound.

By providing the guide groove, the excitation beam guide portion can be stably formed with excellent repeatability. In addition, the excitation beam leaking from the lateral side of the beam guide member can be confined in the excitation guide portion.

(18) In the above-mentioned fiber laser device, the excitation beam guide portion formed by the beam guide member of a fiber-shaped shape, a ribbon-like shape, or a sheet-like shape has a wall thickness of 500 $\mu$m or less.

By selecting the thickness of the excitation beam guide portion to the above-mentioned value or less, the excitation beam can be confined with a reduced loss and transmitted therethrough to be introduced into the laser beam guide portion.

(19) In the above-mentioned fiber laser device, the excitation beam guide portion formed by the beam guide member of a fiber-shaped shape, a ribbon-like shape, or a sheet-like shape and the fiber-shaped laser beam guide portion are alternately stacked in a layered fashion.

By alternately stacking the excitation beam guide portion and the laser beam guide portion, the area of the contact zone therebetween is increased. Therefore, a greater quantity of the excitation beam can be introduced from the excitation beam guide portion into the laser beam guide portion. As a consequence, the fiber laser device of a high output power can be achieved.

(20) In the above-mentioned laser fiber device, the laser beam guide portion wound around the excitation beam guide portion is covered with an optical medium having a refractive index which is equal to or smaller than that of the cladding portion of the laser beam guide portion and which is equal to or greater than that of the beam guide member.

By covering the laser beam guide portion with the above-mentioned optical medium, the excitation beam is transmitted from the excitation beam guide portion to the laser beam guide portion not only through the contact surfaces directly contacted to each other but also through the optical medium. This makes it possible to more efficiently excite the laser active material.

(21) In the above-mentioned fiber laser device, the beam guide member of a fiber-shaped shape, a ribbon-like shape, or a sheet-like shape forming the excitation beam guide portion is produced by wire drawing or extrusion molding.

By the wire drawing or the extrusion molding, the beam guide member of a fiber-shaped shape, a ribbon-like shape, or a sheet-like shape can be easily produced with a desired width and a desired thickness.

(22) In a laser machining device comprising a laser source, means for guiding a laser beam produced from the laser source to an object to be machined, and means for irradiating the laser beam to the object, the laser source comprises the above-mentioned fiber laser device.

By the use of the above-mentioned fiber laser device as the laser source, the optical fiber can readily be connected as the means for guiding the laser beam. Since the laser beam having a high output power and excellent condensing characteristics can be used in machining, fine machining can be carried out at a high efficiency.

EXAMPLES

Now, this invention will be described further in detail in conjunction with typical specific examples.

Example 1

As Example 1, preparation was made of the fiber laser device illustrated in FIGS. 1 and 2A through 2C.

The fiber laser device of this example was formed by winding the ribbon-like beam guide member 21 made of a glass around the outer peripheral surface of the supporting portion 6 of a hollow or a solid cylindrical shape to form the excitation beam guide portion 2 and by winding the fiber-shaped laser beam guide portion (laser fiber) 1 around the surface of the excitation beam guide portion 2.

As the excitation source 41, use was made of the LD device array having a total output power of 30 W at an oscillation wavelength of 0.8 µm.

As the supporting portion 6, use was made of a copper cylinder having an outer diameter of 10 cm, an inner diameter of 9 cm, and a length of 7 cm. The outer surface of the supporting portion 6 was uniformly coated with a resin film having a refractive index of about 1.38.

The beam guide member 21 was formed by wire drawing a silica glass material into a ribbon-like shape having a width of 10 mm and a thickness of 250 µm. The beam guide member 21 of a ribbon-like shape was wound in about 6.5 turns around the outer surface of the supporting portion 6 without any gap. Thus, the excitation beam guide portion 2 of a cylindrical shape was obtained.

The both end faces of the excitation beam guide portion 2 were subjected to optical polishing. Thereafter, the one end face was coated with a multilayer film having a reflectance of 99% or more for the excitation beam. The other end face was connected to a glass ribbon as the excitation beam introducing portion 3 by fusion bonding or heat seal.

The glass ribbon as the excitation beam introducing portion 3 was similar to the glass ribbon forming the beam guide member 21. However, they were individually and separately prepared and then connected by fusion bonding in order to efficiently carry out production of the excitation beam guide portion 2 and coupling of the excitation beam guide portion 2 and the excitation source 41.

As the laser beam guide portion 1, use was made of a laser fiber having a core diameter of 50 µm and a cladding diameter of 125 µm. The core portion of the laser fiber was doped with $Nd^{3+}$ ions at a concentration of 0.5 at %. The fiber was made of a silica glass material. One end of the fiber was subjected to surface polishing and thereafter coated with a multilayer film having a reflectance of 98% or more at the laser oscillation wavelength of 1.06 µm. The other end face of the fiber was simply cut in a vertical direction without any treatment such as coating. The other end face had a reflectance on the order of 4% at the laser oscillation wavelength of 1.06 µm. The laser fiber was wound around the excitation beam guide portion 2 in about 450 turns corresponding to the length of about 140 m to form an entire structure.

The excitation beam guide portion 2 has a refractive index substantially equal to that of the cladding portion of the laser beam guide portion (laser fiber) 1. Thus, the excitation beam transmitted through the excitation beam guide portion 2, repeating the total internal reflection, is introduced into the laser beam guide portion 1 at the contact zone between the excitation beam guide portion 2 and the laser beam guide portion 1 without causing the total internal reflection. In other words, by making the refractive indices of the excitation beam guide portion 2 and the laser beam guide portion 1 be substantially equal to each other at the contact zone therebetween, optical coupling is locally achieved so that the excitation beam can efficiently be introduced from the excitation beam guide portion 2 into the laser beam guide portion 1.

Thus, the excitation beam confined within the excitation beam guide portion 2 and transmitted therethrough can be introduced into the laser beam guide portion 1 at a high efficiency. In this example, the excellent laser beam 52 having an output power of 8 W at the wavelength of 1.06 µm was obtained from the other end 1b as the output end of the laser beam guide portion 1.

Simply by winding the ribbon-like beam guide member 21 prepared by the wire drawing, the excitation beam guide portion 2 of he shape excellent in characteristics such as a confinement loss or a transmission efficiency was easily obtained.

By providing the condensing lens system (having a focal length of 10 mm) for condensing the output laser beam 52 of the fiber laser device, the laser machining device was formed. In this event the energy corresponding to 90% or more of the laser output can be condensed within the diameter of 200 µm. In this case, the condensing diameter of the output laser beam was always constant irrespective of the laser output or thermal conditions.

In Example 1, a single ribbon was used. Alternatively, a plurality of ribbons may be used as illustrated in FIG. 3. In this event, a greater quantity of the excitation beam can be introduced so that an increase in output power is achieved.

Another beam guide member may be wound around the laser beam guide portion. In the foregoing, the one end face of the ribbon-like beam guide member was provided with the high-reflection film. Alternatively, the one end face may be provided with means for introducing the excitation beam. With this structure, a greater quantity of the excitation beam can be supplied so that an increase in output power is achieved.

Example 2

As Example 2, preparation was made of the laser device by the use of the supporting portion 6 as illustrated in FIG. 11B. The supporting portion 6 comprised an aluminum solid cylinder having a diameter of 10 cm with the radiator holes 62 each having a diameter of 10 mm formed at 12 positions. With this structure, the surface area of the supporting portion 6 could be widened by about 30% to considerably improve the radiation effect. Following the increase in radiation effect, the mechanical strength and the stability of the excitation beam guide portion 2 could be improved also.

Example 3

As Example 3, preparation was made of the laser device having a recycling-type beam guide structure illustrated in FIG. 4. In the laser device, the ribbon-like bean guide member 21 was helically wound to obtain the excitation beam guide portion 2 in the form of a generally cylindrical tube. The excitation beam 51 was introduced through the one end 21a of the beam guide member 21 and, when it reached the other end 21b, was re-introduced through the one end 21a to be circulated. The returning beam guide portion 32 was arranged between the other end 21b and the one end 21a of the beam guide member 21.

The excitation beam guide portion 2 was produced by the use of a copper cylinder having an outer diameter of 10 cm, an inner diameter of 9 cm, and a length of 7 cm as the supporting portion 6. The outer peripheral surface of the supporting portion 6 was uniformly coated with a resin film having a refractive index of about 1.38. Thereafter, the ribbon-like beam guide member 21 having a width of 10 mm and a thickness of 250 $\mu$m was wound around the supporting portion 6 in about three turns without a gap. The ribbon-like beam guide member 21 was produced by extending a silica glass material by wire drawing.

The fiber-shaped laser beam guide portion 1 similar to that of the preceding embodiment was wound around the excitation beam guide portion 2 in about 160 turns corresponding to the length of about 45 m to form an entire structure. The excitation source 41 similar to that of the preceding embodiment was used.

As the returning beam guide portion 32, use was made of a tapered ribbon reduced in width from 10 mm to 6 mm. The returning beam guide portion 32 was made of a silica glass material same as that of the beam guide member 21 forming the excitation beam guide portion 2 and had a thickness of 250 $\mu$m and a length of about 1 m.

The one end 21a of the beam guide member 21 was connected to the one end 32a (having the width of 10 mm) of the returning beam guide portion 32. The other end 21b of the beam guide member 21 was connected to the other end 32b (having the width of 5 mm) of the returning beam guide portion 32.

With this structure, the excitation beam could be re-introduced from the other end 21b to the one end 21a of the beam guide member 21 at an efficiency of 95% or more.

The one end 21a of the beam guide member 21 was also connected to the other end 3b of the ribbon-like excitation beam introducing portion 3 in order to introduce the excitation beam 51 from the excitation source 41. Like the returning beam guiding portion 32, the excitation beam introducing portion 3 had a tapered shape reduced in width from 10 mm at the one end 3a to 5 mm at the other end 3b.

The one end 21a of the beam guide member 21 is divided into first and second parts each of which has a width of 5 mm. The first part serves to newly introduce the excitation beam 51 from the excitation source 41 while the second part serves to reintroduce the excitation beam 51.

With the above-mentioned structure, the excitation beam 51 once introduced into the excitation beam guide portion 2 continuously circulates through the excitation beam guide portion 2 until it is absorbed into the laser beam guide portion 1. Thus, almost all of the excitation beam 51 is effectively used for laser excitation.

With the above-mentioned beam guide structure, the length of the laser beam guide portion 1 can be reduced. Specifically, the excitation beam which has not been absorbed is repeatedly re-introduced into the excitation beam guide portion 2 to be circulated therethrough. Therefore, even if the length of the optical path within the excitation beam guide portion 2 is actually short, the effective length of the optical path is sufficiently long in an equivalent sense. As a result, it is easy to design the excitation beam guide portion 2. Even if the excitation beam guide portion 2 is reduced in size, a high excitation efficiency can be achieved.

In addition, it is unnecessary to select the length of the laser beam guide portion 1 so that the excitation beam is absorbed before going out from the excitation beam guide portion 2. Thus, even if the length of the laser beam guide portion 1 is reduced, the loss of the excitation beam can be suppressed. Therefore, even if the length of the laser beam guide portion 1 is reduced, a high-efficiency or a high-output laser beam can be obtained. Since the expensive material of the laser beam guide portion 1 can be reduced in amount, the cost saving effect is also achieved.

The one end 21a of the beam guide member 21 as an inlet for the excitation beam is closed by the other end 3b of the excitation beam introducing portion 3 as an outlet for the excitation beam from the excitation source 41 and the other end 32b of the returning beam guide member 32 as an outlet for the excitation beam to be re-introduced. Therefore, no substantial leakage is allowed through the one end 21a as the inlet.

Thus, in this example, the excellent output laser beam 52 having an output power of 10 W at a wavelength of 1.06 $\mu$m was obtained from the other end 1b as the output end of the laser beam guide portion 1.

Example 4

As Example 4, the laser device having the structure illustrated in FIGS. 13A and 13B was prepared.

In this example, use was made of the ribbon-like beam guide member 21 and the fiber-shaped laser beam guide portion 1 similar to those described in the preceding embodiment.

A copper cylinder was used as the supporting portion 6. The supporting portion 6 was provided with the guide groove 63 having a depth of 550 $\mu$m. The groove 63 had inner surfaces coated with the gold plating film 64. In the manner similar to the foregoing example, the inner surfaces of the groove 63 were uniformly coated with the resin film having a refractive index of about 1.38 which smaller than that of the silica glass material, The ribbon-like beam guide member 21 and the fiber-shaped laser beam guide portion 1 were wound around the supporting portion 6 to be received within the groove 63. Thereafter, a resin material having a refractive index of about 1.46 was applied to embed the laser beam guide portion 1. Furthermore, the groove 63 was covered with the cover member 65 coated with the gold plating film 64.

In the laser device of this example, the resin material covering the laser beam guide portion 1 was substantially equal to that of the silica glass material. Therefore, the excitation beam propagating through the beam guide member 21 can be transferred towards the resin material with a high efficiency. Furthermore, the presence of the resin material enlarges the area of the optical contact zone between the beam guide member 21 and the laser beam guide portion 1. With this structure, the excitation beam can efficiently be absorbed into the laser active material contained in the core portion of the laser beam guide portion (laser fiber) 1 through the cladding portion.

A part of the excitation beam propagating through the beam guide member 21 may leak as leakage light out of the beam guide member 21 without being confined by total internal reflection. Such leakage light is reflected by the reflection surface of the gold plating film 64 to be led to the laser beam guide portion 1. As a consequence, the excitation beam can efficiently be utilized.

Thus, in this example, the excellent output laser beam 52 having an output power of 13 W at a wavelength of 1.06 μm was obtained from the other end 1b as the output end of the laser beam guide portion 1.

Example 5

As Example 5, the laser device having the structure illustrated in FIG. 14 was produced.

In this example, the sheet-like beam guide member 21 forming the excitation beam guide portion 2 was prepared by wire drawing the silica glass material. The sheet-like beam guide member 21 was a glass sheet having a width of 60 mm, a thickness of 250 μm, and a length of 314 mm and had opposite end face subjected to optical polishing.

The cylindrical supporting portion 6 was made of copper and had an outer diameter of 10 cm and an inner diameter of 9 cm was prepared. The sheet-like beam guide member 21 was wound around the cylindrical supporting portion 6 at an inclination of about 1.82°. The opposite end faces were connected to each other by fusion bonding to produce the excitation beam guide portion 2 in the form of a generally cylindrical tube. The supporting portion 6 had the gold plated surface which was covered with the resin film having a refractive index of about 1.38.

Since the beam guide member 21 was wound in an inclined state, the cylindrical excitation beam guide portion 2 had the contact surfaces 21c where the opposite end faces are contacted with each other and a pair of offset surfaces (non-contact surfaces) 211a and 211b where the opposite end faces are not contacted. Each of the offset surfaces 211a and 211b formed an excitation beam incident surface having a width of 10 mm.

Each of the offset surfaces 211a and 211b was connected to the excitation source 41 through the excitation beam guide portion 3 comprising a bundle of optical fibers 31. Each excitation source 41 comprised four LD device arrays each of which includes a single column of 21 LD devices.

Each of the offset surfaces 211a and 211b was connected through the optical fibers 31, 84 in number. Each optical fiber 31 was made of quartz and was of an air-cladding type having no cladding portion.

In this case, each single optical fiber 31 was used to guide the emission from each single LD device. As a whole, the optical fibers 31, 168 in number, corresponding to the LD devices, 168 in number, were used as the excitation beam introducing portion 3.

The optical fibers 31, 168 in number, were divided into two fiber groups each of which contains 84 optical fibers. One fiber group connects the one offset surface 211a and the excitation source 41 while the other fiber group connects the other offset surface 211b and the excitation source 41.

One end face of each optical fiber 31 was directly faced to the emission surface of each individual LD device by the use of the positioning jig 7. The other end face of each optical fiber 31 was connected to the offset surface 211a or 211b by fusion bonding.

Although not illustrated in the figure, the positioning jig 7 had a plurality of guide grooves formed at a pitch of 500 μm. Each groove had a V-shaped section of an angle of 90°. The one ends of the optical fibers 31 were positioned and held in these guide grooves, respectively. The positioning jig 7 was divided into a plurality of units corresponding to each LD array. Each unit is used to position and hold the optical fibers 31, 21 in number, corresponding to the number (21) of LD devices in each LD array.

The laser beam guide portion (laser fiber) 1 was wound around the excitation beam guide portion 2 in 400 turns corresponding to the length of about 125 m to produce the laser device. As the laser beam guide portion 1, use was made of a laser fiber having a core diameter of 50 μm and a cladding diameter of 125 μm, like in Example 1. The core portion of the laser fiber was doped with $Nd^{3+}$ ions at a concentration of 0.5 at %. The laser fiber was made of a silica glass material. The end face of the laser fiber at the one end 1a was subjected to surface polishing and then coated with a multilayer film having a reflectance of 98% or more at the laser oscillation wavelength of 1.06 μm. Tile end face of the laser fiber at the other end 1b was simply cut in a vertical direction without any treatment such as coating. The end face at the other end 1b had a reflectance on the order of 4% at the laser oscillation wavelength of 1.06 μm.

Each single LD device had the optical output power of 2 W. The excitation source 41 could be connected to the excitation beam guide portion 2 at an efficiency of about 90%. Accordingly, the excitation beam of about 300 W could be introduced into the excitation beam guide portion 2. Thus, the excellent output laser beam 52 having an output power of 110 W at the wavelength of 1.06 μm was obtained from the output end of the laser fiber.

The excitation beam guide portion 2 used in the fiber laser device in this example had a simple structure formed by a single turn of the sheet-like beam guide member 21 and was easily prepared.

In this example, the sheet-like beam guide member 21 having a rectangular shape in a plan view was wound around the cylinder in an inclined state. Alternatively, the beam guide member 21 may have a parallelepiped shape formed by obliquely cutting or polishing opposite end faces.

In Example 5, the sheet-like beam guide member 21 was wound to form the excitation beam guide portion 2 in the manner such that a part of each of the opposite end faces of the sheet-like beam guide member 21 is left as the offset surface 211a or 211b. Alternatively, a single offset surface may be provided only on one side of the sheet-like beam guide member 21 in the widthwise direction. Further alternatively, no offset surface is provided on both of the opposite sides in the transversal direction.

In case where the opposite end faces of the sheet-like beam guide member 21 are completely overlapped with each other so that the offset surfaces 211a and 211b are not formed, the excitation beam introducing portion 3 may be a tapered ribbon having the taper cut surface 3c. The taper cut surface 30 is connected by fusion bonding to the sheet-like beam guide member 21 along the side surface thereof. With this structure also the excitation beam can be introduced into the excitation beam guide portion 2.

As described above, the first invention provides a laser device comprising an excitation beam guide portion for confining and propagating an excitation beam, and a longitudinal flexible laser beam guide portion containing a laser active material for producing a laser beam in response to the excitation beam introduced from the excitation beam guide portion into the laser beam guide portion in a distributed state, the excitation beam guide portion being formed by winding or rounding a ribbon-like or a sheet-like flexible beam guide member into a predetermined shape to form a thin integral body as a beam guide structure, at least one long-sized laser beam guide portion as a single-series wave guide structure being wound or rounded around the excitation beam guide portion to be brought into optical contact therewith over an optical contact zone having a predetermined length so that the excitation beam is introduced from the excitation beam guide portion into the laser beam guide portion in the distributed state in which the excitation beam is distributed over the optical contact zone.

It is therefore possible to provide a laser device, a laser machining device, and an optical amplifier which are capable of increasing an efficiency of exciting a laser active material through an excitation beam guide portion to thereby achieve an increase in output power and output efficiency of a laser beam or an improvement in amplification efficiency at a low cost while keeping inherent merits of distributed introduction of an excitation beam into a longitudinal laser beam guide portion such as a laser fiber, for example, easy achievement of a single transverse mode of laser oscillation and production of a laser beam having a high quality in spatial characteristics at a high efficiency.

The second invention provides the laser device in the first invention, wherein the excitation beam guide portion is supported by a supporting portion which serves as a radiator for promoting heat release.

Thus, it is possible to further improve the mechanical strength and the thermal stability of the excitation beam guide portion.

The third invention is the laser device in the first or the second invention, wherein the excitation beam guide portion and the laser beam guide portion are surrounded by a light reflection surface at least in the optical contact zone.

Thus, it is possible to further improve the excitation efficiency by suppressing the loss due to the leakage of the excitation beam.

The fourth invention is the laser device in any one of the first through the third inventions, wherein the excitation beam is introduced into the excitation beam guide portion through one end face of the beam guide member forming the excitation beam guide portion.

The beam guide member forming the excitation beam guide portion has a ribbon-like or a sheet-like shape. The excitation beam is introduced into the beam guide member through a flat end face extending in the transversal direction after it is linearly distributed. Therefore, a large quantity of the excitation beam can easily and efficiently be introduced.

The fifth invention is the lass device in any one of the first through the fourth inventions, wherein the excitation beam is introduced into the excitation beam guide portion through one end face of the beam guide member forming the excitation beam guide portion and, if it reaches the other end face, is re-introduced into the one end face.

Thus, the length of the optical path of the excitation beam within the excitation beam guide portion can be effectively extended to improve the confinement efficiency of the excitation beam. As a result, the excitation beam can efficiently be introduced into the laser beam guide portion in the distributed state.

The sixth invention provides a laser machining device comprising an excitation beam guide portion for confining and propagating an excitation beam, a longitudinal flexible laser beam guide portion containing a laser active material for producing a laser beam in response to the excitation beam introduced from the excitation beam guide portion into the laser beam guide portion in a distributed state, and irradiating means for irradiating the laser beam onto an object to be machined, the excitation beam guide portion being formed by winding or rounding a ribbon-like or a sheet-like flexible beam guide member into a predetermined shape to form a thin integral body as a beam guide structure, at least one long-sized laser beam guide portion as a single-series wave guide structure being wound or rounded around the excitation beam guide portion to be brought into optical contact therewith over an optical contact zone having a predetermined length so that the excitation beam is introduced from the excitation beam guide portion into the laser beam guide portion in the distributed state in which the excitation beam is distributed over the optical contact zone.

Thus, the laser beam having a high output power and excellent condensing characteristics can be used in machining so that fine machining can efficiently be carried out. By the use of the laser fiber as the laser beam guide portion, the optical fiber can easily be connected to guide the laser beam.

The seventh invention provides an optical amplifier comprising an excitation beam guide portion for confining and propagating an excitation beam, and a longitudinal flexible laser beam guide portion containing a laser active material for producing a laser beam in response to the excitation beam introduced from the excitation beam guide portion into the laser beam guide portion in a distributed state, the excitation beam guide portion being formed by winding or rounding a ribbon-like or a sheet-like flexible beam guide member into a predetermined shape to form a thin integral body as a beam guide structure, at least one long-sized laser beam guide portion as a single-series wave guide structure being wound or rounded around the excitation beam guide portion to be brought into optical contact therewith over an optical contact zone having a predetermined length so that the excitation beam is introduced from the excitation beam guide portion into the laser beam guide portion in tile distributed state in which the excitation beam is distributed over the optical contact zone.

Thus, the efficiency of introduction of the excitation beam can be increased so that optical amplification can be carried out at a high efficiency.

In the foregoing, description has been made of preferred embodiments and typical examples. However, it will readily be understood that this invention can be modified in various other manners. For example, the laser beam guide portion may have a ribbon-like shape.

As described above, in the laser device in which the excitation beam is confined within the excitation beam guide portion to be introduced into the laser beam guide portion in the distributed state so that the laser oscillation or amplification is performed, the excitation beam guide portion is formed by winding or rounding the flexible ribbon-like or sheet-like beam guide member to provide the thin integral body as the beam guide structure. Thus, it is possible to easily and economically produce the beam guide structure capable of efficiently confining and introducing the excitation beam in the distributed state. This achieves an increase in output power and efficiency of the laser beam.

In case where the above-mentioned laser device is used as the laser machining device, the laser beam having a high output power and excellent condensing characteristics can be used in machining so that the fine processing can efficiently be performed. In case where the above-mentioned laser device is used as the optical amplifier, optical amplification can be carried out at a low cost and with a high efficiency.

What is claimed is:

1. A laser device comprising an excitation beam guide portion (2) for confining and propagating an excitation beam, and a longitudinal flexible laser beam guide portion (1) containing a laser active material for producing a laser beam (52) in response to the excitation beam (51) introduced from said excitation beam guide portion into said laser beam guide portion in a distributed state, said excitation beam guide portion being formed by winding or rounding a flexible beam guide member (21) into a predetermined shape to form a thin integral body as a beam guide structure, at least one long-sized laser beam guide portion as a single-series wave guide structure being wound or rounded around said excitation beam guide portion to be brought into optical contact therewith over an optical contact zone having a predetermined length so that the excitation beam is introduced from said excitation beam guide portion into said laser beam guide portion in the distributed state in which the excitation beam is distributed over said contact zone.

2. A laser device as claimed in claim 1, wherein said excitation beam guide portion is supported by a supporting portion (6) which serves as a radiator for promoting heat release.

3. A laser device as claimed in claim 1, said excitation beam guide portion and said laser beam guide portion are surrounded by a light reflection surface (64) at least in said optical contact zone.

4. A laser device as claimed in claim 1, wherein the excitation beam is introduced into said excitation beam guide portion through one end face of said beam guide member forming said excitation beam guide portion.

5. A laser device as claimed in claim 1, wherein the excitation beam is introduced into said excitation beam guide portion through one end face of said beam guide member forming said excitation beam guide portion and, if it reaches the other end face,is reintroduced into the one end face.

6. A laser device as claimed in claim 1, wherein a shape of said flexible beam guide member is a ribbon or a sheet.

7. An optical amplifier comprising an excitation beam guide portion for confining and propagating an excitation beam, and a longitudinal flexible laser beam guide portion containing a laser active material for producing a laser beam in response to the excitation beam introduced from said excitation beam guide portion into said laser beam guide portion in a distributed state, said excitation beam guide portion being formed by winding or rounding a flexible beam guide member into a predetermined shape to form a thin integral body as a beam guide structure, at least one long-sized laser beam guide portion as a single-series wave guide structure being wound or rounded around said excitation beam guide portion to be brought into optical contact therewith over an optical contact zone having a predetermined length so that the excitation beam is introduced from said excitation beam guide portion into said laser beam guide portion in the distributed state in which the excitation beam is distributed over said optical contact zone.

8. An optical amplifier as claimed in claim 7, wherein a shape of said flexible beam guide member is a ribbon or a sheet.

9. A laser machining device comprising an excitation beam guide portion for confining and propagating an excitation beam, a longitudinal flexible laser beam guide portion containing a laser active material for producing a laser beam in response to the excitation beam introduced from said excitation beam guide portion into said laser beam guide portion in a distributed state, and irradiating means for irradiating the laser beam onto an object to be machined, said excitation beam guide portion being formed by winding or rounding a flexible beam guide member into a predetermined shape to form a thin integral body as a beam guide structure, at least one long-sized laser beam guide portion as a single-series wave guide structure being wound or rounded around said excitation beam guide portion to be brought into optical contact therewith over an optical contact zone having a predetermined length so that the excitation beam is introduced from said excitation beam guide portion into said laser beam guide portion in the distributed state in which the excitation beam is distributed over said optical contact zone.

10. A laser machining device as claimed in claim 9, wherein a shape of said flexible beam guide member is a ribbon or a sheet.

* * * * *